United States Patent
Tokunaga et al.

(10) Patent No.: US 12,448,320 B2
(45) Date of Patent: **\*Oct. 21, 2025**

(54) ALKALI-FREE GLASS

(71) Applicant: AGC Inc., Tokyo (JP)

(72) Inventors: Hirofumi Tokunaga, Tokyo (JP); Kazutaka Ono, Tokyo (JP)

(73) Assignee: AGC Inc., Tokyo (JP)

( * ) Notice: Subject to any disclaimer, the term of this patent is extended or adjusted under 35 U.S.C. 154(b) by 778 days.

This patent is subject to a terminal disclaimer.

(21) Appl. No.: 17/396,247

(22) Filed: Aug. 6, 2021

(65) Prior Publication Data

US 2021/0387897 A1 Dec. 16, 2021

Related U.S. Application Data

(63) Continuation of application No. PCT/JP2020/004850, filed on Feb. 7, 2020.

(30) Foreign Application Priority Data

| Feb. 7, 2019 | (JP) | 2019-020257 |
| Mar. 19, 2019 | (JP) | 2019-051570 |
| Jul. 31, 2019 | (JP) | 2019-141422 |
| Oct. 10, 2019 | (JP) | 2019-186805 |
| Feb. 5, 2020 | (JP) | 2020-017692 |

(51) Int. Cl.
*C03C 3/091* (2006.01)
*C03C 3/087* (2006.01)

(52) U.S. Cl.
CPC ............. *C03C 3/091* (2013.01); *C03C 3/087* (2013.01)

(58) Field of Classification Search
CPC .................................. C03C 3/087; C03C 3/091
See application file for complete search history.

(56) References Cited

U.S. PATENT DOCUMENTS

| 6,329,310 B1 | 12/2001 | Peuchert et al. |
| 9,580,352 B2 | 2/2017 | Koyama et al. |
| 2008/0127679 A1 | 6/2008 | Nishizawa et al. |
| 2012/0149544 A1 | 6/2012 | Nagai et al. |
| 2012/0282450 A1 | 11/2012 | Kawaguchi et al. |
| 2013/0059718 A1 | 3/2013 | Koyama et al. |
| 2013/0274086 A1 | 10/2013 | Tsujimura et al. |
| 2014/0049708 A1 | 2/2014 | Murata et al. |
| 2015/0045201 A1 | 2/2015 | Tokunaga et al. |
| 2015/0045203 A1 | 2/2015 | Tokunaga et al. |
| 2015/0072130 A1* | 3/2015 | Tokunaga ............... C03C 15/00 216/97 |
| 2015/0087494 A1 | 3/2015 | Tokunaga et al. |
| 2015/0087495 A1 | 3/2015 | Nishizawa et al. |
| 2015/0093561 A1 | 4/2015 | Tokunaga et al. |
| 2015/0218040 A1 | 8/2015 | Koyama et al. |
| 2015/0299028 A1 | 10/2015 | Nishizawa et al. |
| 2016/0002095 A1 | 1/2016 | Tsujimura et al. |
| 2016/0068427 A1 | 3/2016 | Tokunaga et al. |
| 2017/0222321 A1 | 8/2017 | Caratelli et al. |
| 2017/0329192 A1 | 11/2017 | Ono et al. |
| 2019/0047899 A1 | 2/2019 | Tokunaga et al. |
| 2019/0107762 A1 | 4/2019 | Nakamura et al. |
| 2019/0185368 A1 | 6/2019 | Tokunaga et al. |
| 2019/0317376 A1 | 10/2019 | Ono et al. |
| 2020/0021916 A1 | 1/2020 | Akiyama et al. |
| 2020/0131075 A1 | 4/2020 | Saito |
| 2020/0140314 A1 | 5/2020 | Tomamoto et al. |
| 2020/0161741 A1 | 5/2020 | Hiramatsu et al. |
| 2020/0199012 A1 | 6/2020 | Hayashi et al. |
| 2020/0238665 A1 | 7/2020 | Sakurai et al. |
| 2021/0103190 A1 | 4/2021 | Miyake |
| 2021/0363051 A1* | 11/2021 | Tokunaga ............... G02F 1/1333 |
| 2022/0363585 A1 | 11/2022 | Saito |
| 2023/0140716 A1 | 5/2023 | Ono et al. |
| 2023/0142463 A1 | 5/2023 | Ono et al. |

FOREIGN PATENT DOCUMENTS

| CN | 104350018 A | 2/2015 |
| CN | 104364212 A | 2/2015 |
| CN | 104854050 A | 8/2015 |
| CN | 105073670 A | 11/2015 |
| CN | 105271722 A | 1/2016 |
| CN | 105384335 A | 3/2016 |

(Continued)

OTHER PUBLICATIONS

International Search Report issued Mar. 24, 2020 in PCT/JP2020/004847 filed Feb. 7, 2020, 3 pages.
International Search Report issued Mar. 10, 2020 in PCT/JP2020/004848 filed Feb. 7, 2020, 2 pages.
International Search Report issued Mar. 10, 2020 in PCT/JP2020/004850 filed Feb. 7, 2020, 2 pages.

(Continued)

*Primary Examiner* — Elizabeth A. Bolden

(74) *Attorney, Agent, or Firm* — Oblon, McClelland, Maier & Neustadt, L.L.P.

(57) ABSTRACT

An alkali-free glass includes, in mol % in terms of oxides: $SiO_2$: 63-75%; $Al_2O_3$: 10-16%; $B_2O_3$: larger than 0.5% and 5% or smaller; MgO: 0.1-15%; CaO: 0.1-12%; SrO: 0-8%; and BaO: 0-6%. [MgO]/[CaO] is larger than 1.5. A value of Formula (A) is 82.5 or larger. A value of Formula (B) is 690 or larger and 800 or smaller. A value of Formula (C) is 100 or smaller. A value of Formula (D) is 20 or smaller. The alkali-free glass has a Young's modulus of 83 GPa or larger and a surface devitrification viscosity $\eta_c$ of $10^{4.2}$ dPa·s or higher.

55 Claims, No Drawings

(56) References Cited

FOREIGN PATENT DOCUMENTS

| | | | | |
|---|---|---|---|---|
| CN | 105722800 A | * | 6/2016 | ............. C03B 25/08 |
| JP | 2000-302475 A | | 10/2000 | |
| JP | WO2011/078258 A1 | | 6/2011 | |
| JP | 2012-184146 A | | 9/2012 | |
| JP | 2012-236759 A | | 12/2012 | |
| JP | 2013-216562 A | | 10/2013 | |
| JP | 5702888 B2 | | 4/2015 | |
| JP | 5712922 B2 | | 5/2015 | |
| JP | 2015-224150 A | | 12/2015 | |
| JP | 5849965 B2 | | 2/2016 | |
| JP | 2016029001 A | * | 3/2016 | ............. C03C 3/078 |
| JP | 2016-47794 A | | 4/2016 | |
| JP | 5907259 B2 | | 4/2016 | |
| JP | 2016-84242 A | | 5/2016 | |
| JP | 2016-113363 A | | 6/2016 | |
| JP | 2016117641 A | * | 6/2016 | |
| JP | 2016-188148 A | | 11/2016 | |
| JP | 2017-7870 A | | 1/2017 | |
| JP | 2017-063255 A | | 3/2017 | |
| JP | 2017-509266 A | | 3/2017 | |
| JP | 2017-90617 A | | 5/2017 | |
| JP | 2018/184332 A | | 11/2018 | |
| JP | 2019-068368 A | | 4/2019 | |
| KR | 10-2008-0022575 A | | 3/2008 | |
| KR | 10-2008-0085085 A | | 9/2008 | |
| KR | 10-2015-0029632 A | | 3/2015 | |
| WO | WO2008/093580 A1 | | 8/2008 | |
| WO | WO2011/078258 A1 | | 6/2011 | |
| WO | WO 2013/161903 A1 | | 10/2013 | |
| WO | WO2013/172307 A1 | | 11/2013 | |
| WO | WO2013/180220 A1 | | 12/2013 | |
| WO | WO2013/183569 A1 | | 12/2013 | |
| WO | WO2013/183626 A1 | | 12/2013 | |
| WO | WO 2016/084952 A1 | | 6/2016 | |
| WO | WO 2017/188126 A1 | | 11/2017 | |
| WO | WO2017/213191 A1 | | 12/2017 | |
| WO | WO2018/016398 A1 | | 1/2018 | |
| WO | WO 2018/038059 A1 | | 3/2018 | |
| WO | WO2018/181626 A1 | | 10/2018 | |
| WO | WO2019/026963 A1 | | 2/2019 | |
| WO | WO2019/070007 A1 | | 4/2019 | |
| WO | WO2019/107514 A1 | | 6/2019 | |

OTHER PUBLICATIONS

Chikao Tanaka, "Glass Melting Friendly to Environment: Especially on Technological Removal of Bubbles" New Glass 83, vol. 21, No. 4, 2006. pp. 31-36. (partial English Translation).

* cited by examiner

ALKALI-FREE GLASS

TECHNICAL FIELD

The present invention relates to alkali-free glass that is suitable for substrate glass etc. for various displays, photomasks, support for electronic devices, information recording media, planar antennas, dimming laminates, vehicular window glasses, and acoustic vibration plates, etc.

BACKGROUND ART

Conventionally, glass that is used for glass plates (glass substrates) for various displays, photomasks, support for electronic device and information recording media, in particular glass used for glass plates on the surfaces of which a thin-film of a metal, an oxide, or the like is to be formed, is required to have the following properties (1) to (4).

(1) The glass contains substantially no alkali metal ions. This is because if glass contains alkali metal oxides, alkali metal ions diffuse through the above-described thin film and degrade the film characteristics of the thin film.

(2) The strain point is high so that shrinkage (compaction) that accompanies deformation of a glass plate and stabilization of the glass structure occurring when the glass plate is exposed to a high temperature in a thin-film forming process can be minimized.

(3) The chemical durability against various chemicals used for formation of a semiconductor is sufficiently high. In particular, the glass is durable against buffered hydrofluoric acid (BHF: a mixed liquid of hydrofluoric acid and ammonium fluoride) for etching of $SiO_x$ and $SiN_x$, liquid chemicals containing hydrochloric acid and used for ITO etching, various kinds of acids (nitric acid, sulfuric acid, etc.) used for etching a metal electrode, alkalis of resist peeling liquids, etc.

(4) No defects (bubbles, striae, inclusions, pits, scratches, etc.) exist inside or in the surface.

In addition to the above requirements, the following requirements (5) to (9) have been imposed further in recent years:

(5) Glass itself that is small in specific gravity is desired because displays etc. are required to be reduced in weight.

(6) Thickness reduction of glass plates are desired because displays etc. are required to be reduced in weight.

(7) High heat resistance is desired because polysilicon (p-Si; high in heat treatment temperature) type liquid crystal displays have come to be manufactured in addition to conventional amorphous silicon (a-Si) type liquid crystal displays. The heat resistance of a-Si is about 350° C. and that of p-Si is 350-550° C.

(8) To increase the productivity by increasing the temperature rising and dropping rates in fabrication of a display or the like or to increase the thermal shock resistance, glass that is small in average thermal expansion coefficient is required. On the other hand, in the case where the average thermal expansion coefficient of glass is too small, if the number of processes for forming various films such as a gate metal film and a gate insulating film in manufacturing a display or the like is large, the glass is increased in warp, leading to problems, for example, causing troubles such as occurrence of breaking or a scratch during transport of the display or the like and large deviation of exposure patterns.

(9) Furthermore, in recent years, with size increase and thinning of glass substrates, glass having a large specific modulus ((Young's modulus)/density) has been required.

To satisfy requirements as described above, various glass compositions have been proposed so far for, for example, glass for a display panel (refer to Patent Literatures 1-4).

In recent years, the resolution of electronic displays is further increasing. With the increase in resolution, large-size TVs have a problem that the substrate is increased in warp by formation of various kinds of films (e.g., due to film thickness increase of Cu interconnections). This has increased the need for a substrate that is small in warp and, to fulfill this need, it is necessary to increase the Young's modulus of glass.

However, glass having a large Young's modulus as disclosed in Patent Literature 3 or 4 is high in strain point and its devitrification temperature tends to be higher than a temperature $T_4$ at which the glass viscosity becomes $10^4$ dPa·s. This makes it difficult to form glass and it is worried that a resulting increased load on manufacturing facilities may increase the manufacturing cost.

CITATION LIST

Patent Literature

Patent Literature 1: Japanese Patent No. 5702888
Patent Literature 2: WO 2013/183626
Patent Literature 3: Japanese Patent No. 5849965
Patent Literature 4: Japanese Patent No. 5712922

SUMMARY OF INVENTION

Technical Problem

The present inventors have also found the following items to worry about.

As described above, a high strain point or devitrification temperature makes glass manufacture difficult, and it has been found that a high crystal growth rate also raises a problem of difficulty in glass manufacture. More specifically, in the case where the crystal growth rate is high, crystals that have been deposited during a long-term manufacture are mixed into glass and become foreign matter defects. Foreign matter defects mixed into glass may become, even if they are extremely small, origins of fracture of a substrate in handling a large-size substrate, for example. Therefore it is important to lower the crystal growth rate. Incidentally, the present inventors have found that the crystal growth rate and the devitrification temperature have no correlation; that is, the crystal growth rate and the devitrification temperature are independent characteristics. It is therefore difficult to obtain high-quality alkali-free glass at a high productivity if the crystal growth rate is high even when glass having a low devitrification temperature is used.

An object of the present invention is to provide glass that is low in crystal growth rate and even higher in productivity and quality in addition to being able to reduce deformation, such as a warp, of a glass substrate and being high in formability and low in the load on manufacturing facilities.

Solution to Problem

To attain the above object, the invention provides alkali-free glass (1), containing in mol % in terms of oxides:
$SiO_2$: 63-75%;
$Al_2O_3$: 10-16%;
$B_2O_3$: larger than 0.5% and 5% or smaller;
MgO: 0.1-15%;
CaO: 0.1-12%;
SrO: 0-8%; and
BaO: 0-6%,
in which:
[MgO]/[CaO] is larger than 1.5;
a value of Formula (A) is 82.5 or larger, Formula (A) being $1.131[SiO_2]+1.933[Al_2O_3]+0.362[B_2O_3]+2.049[MgO]+1.751[CaO]+1.471[SrO]+1.039[BaO]-48.25$;
a value of Formula (B) is 690 or larger and 800 or smaller, Formula (B) being $35.59[SiO_2]+37.34[Al_2O_3]+24.59[B_2O_3]+31.13[MgO]+31.26[CaO]+30.78[SrO]+31.98[BaO]-2761$;
a value of Formula (C) is 100 or smaller, Formula (C) being $-9.01[SiO_2]+36.36[Al_2O_3]+5.7[B_2O_3]+5.13[MgO]+17.25[CaO]+7.65[SrO]+10.58[BaO]$;
a value of Formula (D) is 20 or smaller, Formula (D) being $-0.731[SiO_2]+1.461[Al_2O_3]-0.157[B_2O_3]+1.904[MgO]+3.36[CaO]+3.411[SrO]+1.723[BaO]+(-3.318[MgO][CaO]-1.675[MgO][SrO]+1.757[MgO][BaO]+4.72[CaO][SrO]+2.094[CaO][BaO]+1.086[SrO][BaO])/([MgO]+[CaO]+[SrO]+[BaO])$; and
the alkali-free glass has a Young's modulus of 83 GPa or larger and a surface devitrification viscosity $\eta_c$ of $10^{4.2}$ dPa·s or higher.

In the alkali-free glass (1) according to the invention, a value of Formula (E) is preferably within a range of 1.50 to 5.50, Formula (E) being $4.379[SiO_2]+5.043[Al_2O_3]+4.805[B_2O_3]+4.828[MgO]+4.968[CaO]+5.051[SrO]+5.159[BaO]-453$.

The alkali-free glass (1) according to the invention preferably has a strain point of 690° C. or higher.

The alkali-free glass (1) according to the invention preferably has a density of 2.8 g/cm³ or lower and an average thermal expansion coefficient in 50-350° C. of $30 \times 10^{-7}$/° C. to $45 \times 10^{-7}$/° C.

The alkali-free glass (1) according to the invention preferably has a temperature $T_2$ at which a glass viscosity becomes $10^2$ dPa·s of 1800° C. or lower and a temperature $T_4$ at which the glass viscosity becomes $10^4$ dPa·s of 1400° C. or lower.

The alkali-free glass (1) according to the invention preferably has an internal devitrification temperature of 1320° C. or lower.

The alkali-free glass (1) according to the invention preferably has an internal devitrification viscosity $\eta_d$ of $10^{4.4}$ dPa·s or higher.

The alkali-free glass (1) according to the invention, preferably has a crystal growth rate of 100 μm/hr or lower.

The alkali-free glass (1) according to the invention may contain at least one selected from the group consisting of $Li_2O$, $Na_2O$, and $K_2O$ in an amount of 0.2% or smaller in total in mol % in terms of oxides.

The invention also provides alkali-free glass (2), containing in mol % in terms of oxides:
$SiO_2$: 50-80%;
$Al_2O_3$: 8-20%;
$Li_2O+Na_2O+K_2O$: 0-0.2%; and
$P_2O_5$: 0-1%,
in which
[MgO]/[CaO] is larger than 1.5, and
the alkali-free glass has:
a Young's modulus of 83 GPa or larger;
a strain point of 690° C. or higher;
a temperature $T_4$ at which a glass viscosity becomes $10^4$ dPa·s of 1400° C. or lower;
a temperature $T_2$ at which the glass viscosity becomes $10^2$ dPa·s of 1800° C. or lower;
an internal devitrification temperature of 1320° C. or lower;
an internal devitrification viscosity $\eta_d$ of $10^{4.4}$ dPa·s or higher;
a surface devitrification viscosity of $10^{4.2}$ dPa·s or higher;
a crystal growth rate of 100 μm/hr or lower;
a density of 2.8 g/cm³ or lower;
a specific modulus of 31 or higher; and
an average thermal expansion coefficient in 50-350° C. of $30 \times 10^{-7}$/° C. to $45 \times 10^{-7}$/° C.

The alkali-free glass (2) according to the invention preferably contains $B_2O_3$ in an amount of 0-5% in mol % in terms of oxides.

The alkali-free glass (2) according to the invention preferably contains, in mol % in terms of oxides, MgO: 0.1-15%, CaO: 0.1-12%, SrO: 0-8%, and BaO: 0-6%.

The alkali-free glass (2) according to the invention preferably contains, in mol % in terms of oxides, $B_2O_3$: 0-5%, MgO: 0.1-15%, CaO: 0.1-12%, SrO: 0-8%, and BaO: 0-6%.

In the alkali-free glass (2) according to the invention, a value of Formula (A) is preferably 82.5 or larger, Formula (A) being $1.131[SiO_2]+1.933[Al_2O_3]+0.362[B_2O_3]+2.049[MgO]+1.751[CaO]+1.471[SrO]+1.039[BaO]"48.25$.

In the alkali-free glass (2) according to the invention, a value of Formula (B) is preferably 690 or larger and 800 or smaller, Formula (B) being $35.59[SiO_2]+37.34[Al_2O_3]+24.59[B_2O_3]+31.13[MgO]+31.26[CaO]+30.78[SrO]+31.98[BaO]-2761$.

In the alkali-free glass (2) according to the invention, a value of Formula (C) is preferably 100 or smaller, Formula (C) being $-9.01[SiO_2]+36.36[Al_2O_3]+5.7[B_2O_3]+5.13[MgO]+17.25[CaO]+7.65[SrO]+10.58[BaO]$.

In the alkali-free glass (2) according to the invention, a value of Formula (D) is preferably 20 or smaller, Formula (D) being $-0.731[SiO_2]+1.461[Al_2O_3]-0.157[B_2O_3]+1.904[MgO]+3.36[CaO]+3.411[SrO]+1.723[BaO]+(-3.318[MgO][CaO]-1.675[MgO][SrO]+1.757[MgO][BaO]+4.72[CaO][SrO]+2.094[CaO][BaO]+1.086[SrO][BaO])/([MgO]+[CaO]+[SrO]+[BaO])$.

In the alkali-free glass (2) according to the invention, a value of Formula (E) is preferably 1.50-5.50, Formula (E) being $4.379[SiO_2]+5.043[Al_2O_3]+4.805[B_2O_3]+4.828[MgO]+4.968[CaO]+5.051[SrO]+5.159[BaO]-453$.

The alkali-free glass (1) and the alkali-free glass (2) according to the invention may each contain F in an amount of 1.5 mol % or smaller.

The alkali-free glass (1) and the alkali-free glass (2) according to the invention may each contain $SnO_2$ in an amount of 0.5% or smaller in mol % in terms of oxides.

The alkali-free glass (1) and the alkali-free glass (2) according to the invention may each contain $ZrO_2$ in an amount of 0.09% or smaller in mol % in terms of oxides.

Each of the alkali-free glass (1) and the alkali-free glass (2) according to the invention preferably has a β-OH value of the glass of 0.01 $mm^{-1}$ or larger and 0.5 $mm^{-1}$ or smaller.

Each of the alkali-free glass (1) and the alkali-free glass (2) according to the invention, preferably has an annealing point of 850° C. or lower.

In each of the alkali-free glass (1) and the alkali-free glass (2) according to the invention, a compaction is preferably 150 ppm or smaller when being held at 600° C. for 80 min. p Each of the alkali-free glass (1) and the alkali-free glass (2) according to the invention preferably has an equivalent cooling rate of 5° C./min or higher and 800° C./min or lower.

In each of the alkali-free glass (1) and the alkali-free glass (2) according to the invention, a sludge volume when it is subjected to an etching process is preferably 30 ml or smaller.

Each of the alkali-free glass (1) and the alkali-free glass (2) according to the invention, preferably has a photoelastic constant of 31 nm/MPa/cm or smaller.

The invention provides a glass plate including the alkali-free glass (1) or the alkali-free glass (2) according to the invention, which preferably has a length of at least one side of 2400 mm or longer and the thickness of 1.0 mm or smaller.

The glass plate according to the invention is preferably manufactured by a float process or a fusion process.

Furthermore, the invention provides a display panel including the alkali-free glass (1) or the alkali-free glass (2) according to the invention.

The invention provides a semiconductor device including the alkali-free glass (1) or the alkali-free glass (2) according to the invention.

The invention provides an information recording medium including the alkali-free glass (1) or the alkali-free glass (2) according to the invention.

The invention provides a planar antenna including the alkali-free glass (1) or the alkali-free glass (2) according to the invention.

The invention provides a dimming laminate including the alkali-free glass (1) or the alkali-free glass (2) according to the invention.

The invention provides a vehicular window glass including the alkali-free glass (1) or the alkali-free glass (2) according to the invention.

The invention provides an acoustic vibration plate including the alkali-free glass (1) or the alkali-free glass (2) according to the invention.

Advantageous Effects of Invention

The invention can provide glass that is low in crystal growth rate and even higher in productivity and quality in addition to being able to suppress deformation, such as a warp, of a glass substrate and being high in formability and low in the load on manufacturing facilities.

DESCRIPTION OF EMBODIMENTS

Alkali-free glass according to the present invention will be hereinafter described.

In the following, the range of the content of each component of glass will be expressed in mol % in terms of oxides.

However, the content of each component in Formula (A) to Formula (E) is a mole % value calculated with an assumption that the total amount of seven components $SiO_2$, $Al_2O_3$, $B_2O_3$, MgO, CaO, SrO, and BaO is 100 mol %.

In the following, a numerical value range expressed in the form of "A-B" means a range including the numerical values A and B as a minimum value and a maximum value, respectively, that is, a range that is larger than or equal to the numerical value A and smaller than or equal to the numerical value B.

In the case where the content of $SiO_2$ is smaller than 50 mol % (hereinafter written simply as "%"), there are tendencies that the strain point is not sufficiently high and the average thermal expansion coefficient and the specific gravity are large. Thus, the content of $SiO_2$ is 50% or larger. The $SiO_2$ content is preferably 55% or larger, more preferably 60% or larger, more preferably 63% or larger, more preferably 64% or larger, more preferably 65% or larger, more preferably 66% or larger, particularly preferably 66.5% or larger, and most preferably 67% or larger.

In the case where the content of $SiO_2$ is larger than 80%, there are tendencies that the glass solubility is low, the Young's modulus is small, and the devitrification temperature is high. Thus, the content of $SiO_2$ is 80% or smaller. The $SiO_2$ content is preferably 75% or smaller, more preferably 74% or smaller, more preferably 73% or smaller, more preferably 72% or smaller, particularly preferably 71.5% or smaller, and most preferably 71% or smaller.

$Al_2O_3$ reduces a warp by increasing the Young's modulus and increases the glass strength by reducing the phase separationability so as to increase the fracture toughness. In the case where the content of $Al_2O_3$ is smaller than 8%, these effects do not tend to be exhibited and the contents of other components that increase the average thermal expansion coefficient relatively increase, as a result of which the average thermal expansion coefficient tends to be large. Thus, the content of $Al_2O_3$ is 8% or larger. The $Al_2O_3$ content is preferably 8.5% or larger, more preferably 9% or larger, more preferably 9.5% or larger, more preferably 10% or larger, more preferably 10.2% or larger, more preferably 10.4% or larger, more preferably 10.6% or larger, particularly preferably 10.8% or larger, particularly preferably 11% or larger, particularly preferably 11.2% or larger, and most preferably 11.4% or larger.

In the case where the content of $Al_2O_3$ is larger than 20%, the glass solubility may become low, the strain point may become high, and the devitrification temperature may become high. Thus, the content of $Al_2O_3$ is 20% or smaller. The $Al_2O_3$ content is preferably 18% or smaller, more preferably 17% or smaller, more preferably 16.5% or smaller, more preferably 16% or smaller, more preferably 15.5% or smaller, more preferably 15% or smaller, more preferably 14.7% or smaller, particularly preferably 14.5% or smaller, and most preferably 14.3% or smaller.

$B_2O_3$ can be contained in an amount of 5% or smaller because $B_2O_3$ increases the BHF resistance, increases the glass melting reactivity, and lowers the devitrification temperature. The content of $B_2O_3$ is preferably 4% or smaller, more preferably 3.5% or smaller, more preferably 3% or smaller, more preferably 2.8% or smaller, more preferably 2.6% or smaller, more preferably 2.5% or smaller, particularly preferably 2.4% or smaller, and most preferably 2.3% or smaller. To exhibit the above effects, the content of $B_2O_3$ is preferably larger than 0.5%, more preferably 0.8% or larger, more preferably 1.2% or larger, particularly preferably 1.5% or larger, and most preferably 1.7% or larger.

MgO can be contained because MgO increases the Young's modulus without increasing the specific gravity and hence can alleviate the warp problem by increasing the specific modulus and increases the glass strength by increasing the fracture toughness value. MgO also increases the solubility. In the case where the content of MgO is smaller than 0.1%, these effects do not tend to be exhibited and the thermal expansion coefficient may become too small. Thus, the content of MgO is preferably 0.1% or larger, more preferably 4% or larger, more preferably 5% or larger, more preferably 5.5% or larger, more preferably 6% or larger, particularly preferably 6.2% or larger, and most preferably 6.5% or larger.

However, when the MgO content is too large, the devitrification temperature tends to increase. Thus, the content of MgO is preferably 15% or smaller, more preferably 14% or smaller, more preferably 13% or smaller, more preferably 12% or smaller, more preferably 11.5% or smaller, more preferably 11% or smaller, more preferably 10.5% or smaller, particularly preferably 10% or smaller, and most preferably 9.5% or smaller.

CaO has features of increasing the specific modulus to an extent next to MgO among the alkali earth metals and not lowering the strain point excessively, and increases the solubility like MgO. CaO can be contained since CaO also has a feature of being less prone to increase the devitrification temperature than MgO. These effects do not tend to be exhibited if the content of CaO is smaller than 0.1%. Thus, the CaO content is preferably 0.1% or larger, more preferably 3% or larger, more preferably 3.5% or larger, more preferably 4% or larger, more preferably 4.5% or larger, particularly preferably 5% or larger, particularly preferably 5.5% or larger, particularly preferably 6% or larger, and most preferably 7% or larger.

In the case where the content of CaO is larger than 12%, the average expansion coefficient becomes too large and the devitrification temperature becomes so high that a devitrification problem is prone to arise during glass manufacture. Thus, the CaO content is preferably 12% or smaller, more preferably 11% or smaller, more preferably 10% or smaller, more preferably 9% or smaller, particularly preferably 8.5% or smaller, and most preferably 8% or smaller.

SrO can be contained because SrO does not increase the glass devitrification temperature, and increases the solubility. The content of SrO is preferably 0.1% or larger, more preferably 0.5% or larger, more preferably 1% or larger, particularly preferably 1.2% or larger, and most preferably 1.3% or larger.

The above-described effect of SrO is lower than that of BaO, and when an SrO content is too large, the specific gravity rather increases and the average thermal expansion coefficient becomes too large. Thus, the content of SrO is preferably 8% or smaller, more preferably 6% or smaller, more preferably 5% or smaller, particularly preferably 4% or smaller, and most preferably 3% or smaller.

BaO can be contained because BaO does not increase the glass devitrification temperature, and increases the solubility. The content of BaO is preferably 0.1% or larger, more preferably 0.3% or larger, more preferably 0.5% or larger, more preferably 0.8% or larger, and more preferably 1% or larger.

When a BaO content is too large, the specific gravity tends to increase, the Young's modulus tends to decrease, and the average thermal expansion coefficient tends to be too large. Thus, in the alkali-free glass according to the invention, the content of BaO is preferably 6% or smaller, more preferably 5.5% or smaller, more preferably 5% or smaller, particularly preferably 4.5% or smaller, and most preferably 4% or smaller.

As [MgO]/[CaO] which is the mixing ratio of MgO to CaO increases, the specific modulus increases. In the case where the specific modulus (Young's modulus/density) of glass is high, a large-size thin glass substrate can be prevented from being bent in device manufacturing line so that a problem can be prevented. Therefore, [MgO]/[CaO] is larger than 1.5. [MgO]/[CaO] is preferably 1.8 or larger, more preferably 2 or larger, more preferably 2.5 or larger.

[MgO]/[CaO] is preferably 20 or smaller, more preferably 15 or smaller, particularly preferably 10 or smaller. It is noted that the term [metal oxide] such as [MgO] represents the content in mol % of the metal oxide.

The alkali-free glass according to the invention contains substantially no alkali metal oxides such as $Li_2O$, $Na_2O$, and $K_2O$. In the invention, the expression "to contain substantially no alkali metal oxides" means that no alkali metal oxides are contained except unavoidable impurities mixed from raw materials etc., that is, no alkali metal oxides are contained intentionally. However, alkali metal oxides may be contained at prescribed contents to obtain a particular effect (e.g., lower the strain point, Tg, or annealing point). More specifically, at least one selected from the group consisting of $Li_2O$, $Na_2O$, and $K_2O$ may be contained at a total content of 0.2% or smaller in mol % in terms of oxides. The total content is preferably 0.15% or smaller, more preferably 0.1% or smaller, more preferably 0.08% or smaller, more preferably 0.05% or smaller, and particularly preferably 0.03% or smaller. At least one selected from the group consisting of $Li_2O$, $Na_2O$, and $K_2O$ may be contained at a total content of 0.001% or larger in mol % in terms of oxides.

To prevent degradation of the characteristics of thin-film of a metal, oxide or the like formed on the surface of the glass plate when an alkali-free glass plate is used in manufacture of a display, it is preferable that the alkali-free glass according to the invention contain substantially no $P_2O_5$. In the invention, the expression "to contain substantially no $P_2O_5$" means that its content is, for example, 1% or smaller, even preferably 0.5% or smaller and further preferably 0.1% or smaller. Furthermore, to facilitate glass recycling and lower the load on the environment, it is preferable that substantially no PbO, $As_2O_3$, or $Sb_2O_3$ be contained. In the invention, the expression "to contain substantially no PbO, $As_2O_3$, or $Sb_2O_3$" means that the content of each of PbO, $As_2O_3$, and $Sb_2O_3$ is, for example, 0.01% or smaller, preferably 0.005% or smaller.

On the other hand, to increase the glass solubility, clarity, formability, etc., one or both of $As_2O_3$ and $Sb_2O_3$ may be contained at a total content of 1% or smaller. The total content is preferably 0.5% or smaller, more preferably 0.3% or smaller, more preferably 0.2% or smaller, more preferably 0.15% or smaller, and more preferably 0.1% or smaller.

To increase the glass solubility, clarity, formability, etc., the alkali-free glass according to the invention may contain one or more of $ZrO_2$, ZnO, $Fe_2O_3$, $SO_3$, F, Cl, and $SnO_2$ at a total content of 2% or smaller, even preferably 1% or smaller and further preferably 0.5% or smaller.

Where F is contained among these substances to increase the glass solubility and clarity, the content of F is preferably 1.5% or smaller (0.43 mass % or smaller), more preferably 1% or smaller, more preferably 0.5% or smaller, more preferably 0.3% or smaller, more preferably 0.1% or smaller, particularly preferably 0.05% or smaller, and most preferably 0.01% or smaller. It is noted that the F content does not indicate an amount that is input to glass raw materials but an amount remaining in molted glass. This also applies to the content of Cl to be described later.

In the case where $SnO_2$ is contained among the above substances to improve the glass solubility and clarity, the content of $SnO_2$ is preferably 0.5% or smaller (1.1 mass % or smaller).

To lower the glass melting temperature, increase the Young's modulus, and improve the resistance to chemicals, $ZrO_2$ may be contained at 0.001% or larger (0.001 mass % or larger).

However, too large a $ZrO_2$ content may increase the devitrification temperature, increase the permittivity ε, or make glass uneven. Furthermore, in the case where glass containing $ZrO_2$ is applied to a semiconductor device, a failure may be caused by α rays. The content of $ZrO_2$ is preferably 0.09% or smaller (0.09 mass % or smaller), more preferably 0.08% or smaller (0.08 mass % or smaller), more preferably 0.07% or smaller (0.07 mass % or smaller), more preferably 0.06% or smaller (0.06 mass % or smaller), more preferably 0.05% or smaller (0.05 mass % or smaller), more preferably 0.04% or smaller (0.04 mass % or smaller), and particularly preferably 0.03% or smaller (0.03 mass % or smaller). It is most preferable that substantially no $ZrO_2$ be contained. The expression "to contain substantially no $ZrO_2$" means that no $ZrO_2$ is contained except unavoidable impurities mixed from raw materials etc., that is, no $ZrO_2$ is contained intentionally.

To increase the glass solubility, $Fe_2O_3$ may be contained in a range of 0.001% or higher and 0.05% or smaller. In the case where the iron content in glass is lowered, the degree of infrared absorbance due to $Fe^{2+}$ in a melting process decreases, resulting in increase of the heat conductivity of the glass. As a result, for example when the glass is melted by heating it by heat rays of burner flames or the like in a glass melting furnace, molten glass has a narrow temperature distribution and hence its convection speed becomes low, as a result of which the bubble quality and the uniformity of a glass product may become worse. High clarity and uniformity require sufficient convention in molten glass.

When the iron content in glass is increased, iron comes to exist in the form of $Fe^{2+}$ or $Fe^{3+}$ and hence the transmittance of the glass may lower. In particular, since $Fe^{3+}$ has an absorption in a wavelength range that is shorter than or equal to 300 nm, the ultraviolet transmittance of the glass may be lowered. To obtain glass that is 0.5 mm in plate thickness and whose transmittance at a wavelength 300 nm is 20% or higher, the Fe content ($Fe_2O_3$ conversion) is preferably 0.05% or smaller, more preferably 0.04% or smaller, more preferably 0.03% or smaller, more preferably 0.02% or smaller, more preferably 0.01% or smaller, more preferably 0.008% or smaller, more preferably 0.006% or smaller, more preferably 0.004% or smaller, and particularly preferably 0.002% or smaller.

On the other hand, when it is desired to increase the glass solubility, the Fe content ($Fe_2O_3$ conversion) is preferably 0.001% or larger, more preferably 0.002% or larger, more preferably 0.005% or larger, more preferably 0.008% or larger, more preferably 0.01% or larger, more preferably 0.02% or larger, more preferably 0.03% or larger, and particularly preferably 0.04% or larger.

To increase the clarity of glass, Cl may be contained in a range of 0.1-1.0%. In the case where the Cl content is smaller than 0.1%, the clarifying action during melting of glass raw materials may be lowered. The Cl content is preferably 0.15% or larger, more preferably 0.2% or larger, more preferably 0.25% or larger, and particularly preferably 0.3% or larger.

In the case where the Cl content is larger than 1.0%, the action of preventing size increase of a foam layer during glass manufacture may be lowered. The Cl content is preferably 0.8% or smaller, more preferably 0.6% or smaller.

To improve the solubility, clarity, formability, etc. of glass, obtain absorption at a particular wavelength, or improve the density, hardness, flexural rigidity, durability, etc., the alkali-free glass according to the invention may contain one or more of $Se_2O_3$, $TeO_2$, $Ga_2O_3$, $In_2O_3$, $GeO_2$, CdO, BeO, and $Bi_2O_3$ at a total concentration of 2% or smaller, more preferably 1% or smaller, more preferably 0.5% or smaller, more preferably 0.3% or smaller, more preferably 0.1% or smaller, particularly preferably 0.05% or smaller, and most preferably 0.01% or smaller. The $GeO_2$ content is preferably smaller than 0.1%, more preferably 0.08% or smaller, more preferably 0.05% or smaller, particularly preferably 0.03% or smaller, and most preferably 0.01% or smaller. It is most preferable that substantially no $GeO_2$ be contained. The expression "to contain substantially no $GeO_2$" means that no $GeO_2$ is contained except unavoidable impurities mixed from raw materials etc., that is, no $GeO_2$ is contained intentionally.

To improve the solubility, clarity, formability, etc. of glass or improve the glass hardness (e.g., Young's modulus), the alkali-free glass according to the invention may contain rare earth oxides or transition metal oxides.

The alkali-free glass according to the invention may contain, as rare earth oxides, one or more of $Sc_2O_3$, $Y_2O_3$, $La_2O_3$, $Ce_2O_3$, $CeO_2$, $Pr_2O_3$, $Nd_2O_3$, $Pm_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, and $Lu_2O_3$ at a total content of 2% or smaller, preferably 1% or smaller, more preferably 0.5% or smaller, more preferably 0.3% or smaller, more preferably 0.1% or smaller, particularly preferably 0.05% or smaller, and most preferably 0.01% or smaller. The content of $La_2O_3$ is preferably smaller than 1%, more preferably 0.5% or smaller, more preferably 0.3% or smaller, particularly preferably 0.1% or smaller, and most preferably 0.05% or smaller. It is most preferable that substantially no $La_2O_3$ be contained. The expression "to contain substantially no $La_2O_3$" means that no $La_2O_3$ is contained except unavoidable impurities mixed from raw materials etc., that is, no $La_2O_3$ is contained intentionally.

The alkali-free glass according to the invention may contain, as transition metal oxides, one or more of $V_2O_5$, $Ta_2O_3$, $Nb_2O_5$, $WO_3$, $MoO_3$, and $HfO_2$ at a total content of 2% or smaller, preferably 1% or smaller, more preferably 0.5% or smaller, more preferably 0.3% or smaller, more preferably 0.1% or smaller, particularly preferably 0.05% or smaller, and most preferably 0.01% or smaller.

To improve the glass solubility, the alkali-free glass according to the invention may contain $ThO_2$ which is an actinoid oxide at a concentration of 2% or smaller, preferably 1% or smaller, more preferably 0.5% or smaller, more preferably 0.3% or smaller, more preferably 0.1% or smaller, particularly preferably 0.05% or smaller, particularly preferably 0.01% or smaller, and most preferably 0.005% or smaller.

In the alkali-free glass according to the invention, the β-OH value is preferably 0.01 $mm^{-1}$ or larger and 0.5 $mm^{-1}$ or smaller. The β-OH value, which is an index of a water content in glass, is determined by measuring absorbance of a glass sample for light in a wavelength range of 2.75-2.95 μm and dividing a maximum absorbance value $β_{max}$ by a thickness (mm) of the sample. In the case where the β-OH value is 0.5 $mm^{-1}$ or smaller, a compaction value (described later) that is obtained when a sample is held at 600° C. for 80 min is likely to be achieved. The β-OH value is more preferably 0.45 $mm^{-1}$ or smaller, more preferably 0.4 $mm^{-1}$ or smaller, more preferably 0.35 $mm^{-1}$ or smaller, more preferably 0.3 $mm^{-1}$ or smaller, more preferably 0.28 $mm^{-1}$ or smaller, more preferably 0.25 $mm^{-1}$ or smaller, more preferably 0.23 $mm^{-1}$ or smaller, more preferably 0.2 $mm^{-1}$ or smaller, more preferably 0.15 $mm^{-1}$ or smaller, more preferably 0.1 $mm^{-1}$ or smaller, particularly preferably 0.08 $mm^{-1}$ or smaller, and most preferably 0.06 $mm^{-1}$ or smaller. On the other hand, in the case where the β-OH value is 0.01 mm$^{-1}$ or larger, a glass strain point (described later) is likely to be achieved. In the case, the β-OH value is more preferably 0.05 mm$^{-1}$ or larger, more preferably 0.08 mm$^{-1}$ or larger, more preferably 0.1 mm$^{-1}$ or larger, more preferably 0.13 mm$^{-1}$ or larger, particularly preferably 0.15 mm$^{-1}$ or larger, and most preferably 0.18 mm$^{-1}$ or larger.

In the alkali-free glass according to the invention, the value that is represented by the following Formula (A) is preferably 82.5 or larger.

$$1.131[SiO_2]+1.933[Al_2O_3]+0.362[B_2O_3]+2.049[MgO]+1.751[CaO]+1.471[SrO]+1.039[BaO]-48.25 \quad (A)$$

The value represented by Formula (A) is an index of the Young's modulus of the alkali-free glass according to the invention, and the Young's modulus tends to be small if this value is smaller than 82.5. To obtain a large Young's modulus value in the alkali-free glass according to the invention, the value represented by Formula (A) is preferably 83 or larger, more preferably 83.5 or larger, more preferably 84 or larger, particularly preferably 84.5 or larger, and most preferably 85 or larger.

In the alkali-free glass according to the invention, the value that is represented by the following Formula (B) is preferably 690 or larger and 800 or smaller.

$$35.59[SiO_2]+37.34[Al_2O_3]+24.59[B_2O_3]+31.13[MgO]+31.26[CaO]+30.78[SrO]+31.98[BaO]-2761 \quad (B)$$

The value represented by Formula (B) is an index of the strain point of the alkali-free glass according to the invention, and the strain point tends to be high if this value is larger than 800. The load on manufacturing facilities can be made low if the value represented by Formula (B) is 800 or smaller. For example, the surface temperature of rollers used for glass forming can be lowered, such that the life of facilities can be elongated and the productivity can be increased. To lower the strain point in the alkali-free glass according to the invention, the value represented by Formula (B) is more preferably 760 or smaller, more preferably 750 or smaller, particularly preferably 745 or smaller, and most preferably 740 or smaller.

If this value is smaller than 690, the compaction may become too large. Thus, this value is 690 or larger. The value represented by Formula (B) is preferably 695 or larger, more preferably 700 or larger, more preferably 710 or larger, particularly preferably 715 or larger, more preferably 720 or larger, more preferably 725 or larger, and most preferably 730 or larger.

In the alkali-free glass according to the invention, the value represented by the following Formula (C) is preferably 100 or smaller.

$$-9.01[SiO_2]+36.36[Al_2O_3]+5.7[B_2O_3]+5.13[MgO]+17.25[CaO]+7.65[SrO]+10.58[BaO] \quad (C)$$

The value represented by Formula (C) is an index of the crystal growth rate of the alkali-free glass according to the invention, and the crystal growth rate is low if this value is 100 or smaller. To make low the crystal growth rate in a flow path of molten glass in the alkali-free glass according to the invention, the value represented by Formula (C) is preferably 95 or smaller, more preferably 90 or smaller, more preferably 85 or smaller, particularly preferably 80 or smaller, and most preferably 75 or smaller.

The present inventors have found that the crystal growth rate and the devitrification temperature have no correlation; that is, the crystal growth rate and the devitrification temperature are independent characteristics. It is therefore difficult to obtain high-quality alkali-free glass at a high productivity if the crystal growth rate is high even if glass having a low devitrification temperature is used.

To perform surface cleaning or decrease the plate thickness, a glass plate may be etched using an etching liquid containing hydrofluoric acid (HF), for example (hereinafter referred to as "etching treatment"). Thus, a glass plate is required to be high in workability when subjected to etching treatment. That is, it is required that the etching treatment speed be in a practical range and sludge produced by the etching treatment be small in amount and is not prone to gel.

In the alkali-free glass according to the invention, the value represented by the following Formula (D) is preferably 20 or smaller.

$$-0.731[SiO_2]+1.461[Al_2O_3]-0.157[B_2O_3]+1.904[MgO]+3.36[CaO]+3.411[SrO]+1.723[BaO]+(-3.318[MgO][CaO]-1.675[MgO][SrO]+1.757[MgO][BaO]+4.72[CaO][SrO]+2.094[CaO][BaO]+1.086[SrO][BaO])/([MgO]+[CaO]+[SrO]+[BaO]) \quad (D)$$

The value represented by Formula (D) is an index of a sludge volume of the alkali-free glass according to the invention at the time of etching treatment, and the sludge volume at the time of hydrofluoric acid etching treatment, for example, is low if this value is 20 or smaller. As a result, a phenomenon that sludge produced during etching treatment sticks to the glass surface again is prevented, such that a resulting surface can be made uniform and a glass product that is superior in surface roughness and surface flatness can be obtained. Furthermore, a glass product that is superior in surface cleanliness can be provided. The value represented by Formula (D) is more preferably 18 or smaller, more preferably 16 or smaller, more preferably 15 or smaller, more preferably 14 or smaller, more preferably 13.5 or smaller, more preferably 12 or smaller, more preferably 11 or smaller, particularly preferably 10 or smaller, and most preferably 9 or smaller.

In some cases, a glass substrate is subjected to etching treatment to clean the surface of a glass plate or make a glass plate thinner. Glass is required to exhibit a proper etching rate in etching treatment.

In the alkali-free glass according to the invention, the value represented by the following Formula (E) is preferably in a range of 1.50-5.50.

$$4.379[SiO_2]+5.043[Al_2O_3]+4.805[B_2O_3]+4.828[MgO]+4.968[CaO]+5.051[SrO]+5.159[BaO]-453 \quad (E)$$

The value represented by Formula (E) is an index of the etching treatment speed of the alkali-free glass according to the invention, and in the case where this value is 1.50 or larger, the etching treatment speed falls within a realistic range. However, if the etching treatment speed is too high, it becomes difficult to control the etching treatment, possibly causing a problem such as deterioration of the surface roughness of a glass plate. In the case where this value is 5.50 or smaller, such problems are not caused. The value represented by Formula (E) is more preferably 1.90 or larger, more preferably 2.00 or larger, more preferably 2.50 or larger, more preferably 3.00 or larger, more preferably 3.20 or larger, more preferably 3.50 or larger, and particularly preferably 4.00 or larger, most preferably 4.30 or larger. The value represented by Formula (E) is preferably 5.00 or smaller, more preferably 4.80 or smaller and more preferably 4.60 or smaller.

The Young's modulus of the alkali-free glass according to the invention is 83 GPa or larger. The degree of deformation of a substrate when it is subjected to external stress is reduced if the Young's modulus is in this range. For example, a warp of a glass substrate when a film is formed on its surface can be reduced. For a specific example, in manufacture of a TFT-side substrate of a flat panel display, a warp of the substrate is reduced when a gate metal film made of copper or so on or a gate insulating film made of silicon nitride or so on is formed on the surface of the substrate. Furthermore, a warp can be reduced when, for example, the substrate size is made large. Still further, breakage of the substrate can be prevented in handling a substrate that is increased in size. The Young's modulus is more preferably 83.5 GPa or larger, more preferably 84 GPa or larger, more preferably 84.5 GPa or larger, and particularly preferably 85 GPa or larger, most preferably larger than 85 GPa. In the alkali-free glass according to the invention, a Young's modulus can be measured by an ultrasonic method. The Young's modulus is preferably 115 GPa or smaller.

In the alkali-free glass according to the invention, the strain point is preferably 690° C. or higher. In the case where the strain point is lower than 690° C., shrinkage (compaction) that accompanies deformation of a glass plate and stabilization of the glass structure tends to occur when the glass plate is exposed to a high temperature in a display thin-film forming process. The strain point is preferably 700° C. or higher, more preferably 710° C. or higher, more preferably 720° C. or higher, particularly preferably 725° C. or higher, and most preferably 730° C. or higher. On the other hand, if the strain point is too high, it is necessary to increase the temperature of an annealing machine accordingly, which tends to shorten the life of the annealing machine. Therefore, the strain point is preferably 800° C. or lower. Furthermore, the glass formability becomes high as the strain point lowers. The strain point is preferably 780° C. or lower, more preferably 760° C. or lower, more preferably 750° C. or lower, particularly preferably 745° C. or lower, and most preferably 740° C. or lower.

In the alkali-free glass according to the invention, a temperature $T_4$ at which the glass viscosity becomes $10^4$ dPa·s is preferably 1400° C. or lower. The glass formability is superior if this condition is satisfied. Furthermore, for example, the amount of vaporized substances in an atmosphere around glass can be reduced and defects in the glass can be decreased by lowering the temperature during glass forming. Since glass can be formed at a low temperature, the load on manufacturing facilities can be lowered. For example, the facility life of a float bath etc. that are used in forming glass can be elongated and the productivity can be increased. $T_4$ is preferably 1350° C. or lower, more preferably 1340° C. or lower, more preferably 1330° C. or lower, more preferably 1320° C. or lower, more preferably 1310° C. or lower, more preferably 1300° C. or lower, more preferably 1295° C. or lower, particularly preferably 1290° C. or lower, and most preferably 1285° C. or lower.

$T_4$ can be determined by measuring viscosity using a rotary viscometer and determining a temperature at which the viscosity becomes $10^4$ dPa·s according to a method that is prescribed in ASTM C 965-96 (year 2017). In Examples described later, NBS710 and NIST717a were used as reference samples for instrument calibration.

In the alkali-free glass according to the invention, a temperature $T_2$ at which the glass viscosity becomes $10^2$ dPa·s is preferably 1800° C. or lower. In the case where $T_2$ is 1800° C. or lower, the glass solubility becomes high and the load on manufacturing facilities can be lowered. For example, the facility life of a furnace for solving glass and so on can be elongated and the productivity can be increased. Furthermore, furnace-origin defects (e.g., spot defects and $ZrO_2$ defects) can be reduced. $T_2$ is more preferably 1770° C. or lower, more preferably 1750° C. or lower, more preferably 1740° C. or lower, more preferably 1730° C. or lower, more preferably 1720° C. or lower, more preferably 1710° C. or lower, more preferably 1700° C. or lower, particularly preferably 1690° C. or lower, and most preferably 1680° C. or lower.

In the alkali-free glass according to the invention, the internal devitrification temperature is preferably 1320° C. or lower. The glass formability is high if this condition is satisfied. A phenomenon can be prevented that crystals are formed inside the glass during forming and the transmittance is lowered. Furthermore, the load on manufacturing facilities can be lowered. For example, the life of such facilities as a float bath and a fusion to be used for forming glass can be elongated and the productivity can be increased.

The internal devitrification temperature is more preferably 1310° C. or lower, more preferably 1300° C. or lower, more preferably 1280° C. or lower, particularly preferably 1260° C. or lower, and most preferably lower than 1240° C.

In the invention, an internal devitrification temperature can be determined in the following manner. That is, pulverized glass particles are put into a platinum dish and then subjected to heat treatment for 17 hours in an electric furnace that is controlled at a constant temperature. After the heat treatment, a maximum temperature at which crystals are deposited inside glass and a minimum temperature at which no crystals are deposited are determined through observation using an optical microscope and an average value of them is employed as an internal devitrification temperature.

In the alkali-free glass according to the invention, the glass internal devitrification viscosity $\eta_d$ is preferably $10^{4.4}$ dPa·s or higher. In this case, foreign matter defects due to devitrification are not prone to occur during forming by a fusion process or a float process. The glass internal devitrification viscosity $\eta_d$ is more preferably $10^{4.5}$ dPa·s or higher, more preferably $10^{4.6}$ dPa·s or higher, particularly preferably $10^{4.7}$ dPa·s or higher, and most preferably $10^{4.8}$ dPa·s or higher.

In the invention, internal devitrification viscosity $\eta_d$ can be determined in the following manner. That is, a glass internal devitrification temperature is determined by the above-described method and glass internal devitrification viscosity $\eta_d$ is determined by measuring glass viscosity $\eta$ at the glass internal devitrification temperature.

In the alkali-free glass according to the invention, the surface devitrification temperature is preferably 1370° C. or lower. In this case, superior glass formability is obtained. A phenomenon can be prevented that the transmittance lowers due to formation of crystals inside the glass during forming. Furthermore, the load on manufacturing facilities can be lowered. For example, the life of such facilities as a float bath and a fusion to be used for forming glass can be elongated and the productivity can be increased.

The surface devitrification temperature is more preferably 1360° C. or lower, more preferably 1350° C. or lower, more preferably 1340° C. or lower, more preferably 1330° C. or lower, more preferably 1320° C. or lower, more preferably 1310° C. or lower, more preferably 1300° C. or lower, more preferably 1290° C. or lower, particularly preferably 1280° C. or lower, and most preferably 1270° C. or lower.

In the invention, a surface devitrification temperature can be determined in the following manner. That is, pulverized glass particles are put into a platinum dish and then subjected to heat treatment for 17 hours in an electric furnace that is controlled at a constant temperature. After the heat treatment, a maximum temperature at which crystals are deposited in the glass surface and a minimum temperature at which no crystals are deposited are determined through observation using an optical microscope and an average value of them is employed as a surface devitrification temperature.

In the alkali-free glass according to the invention, the glass surface devitrification viscosity $\eta_c$ is $10^{4.2}$ dPa·s or higher. In this case, foreign matter defects due to devitrification are not prone to occur during forming by a fusion process or a float process. The glass surface devitrification viscosity $\eta_c$ is preferably $10^{4.3}$ dPa·s or higher, more preferably $10^{4.4}$ dPa·s or higher, more preferably $10^{4.5}$ dPa·s or higher, and particularly preferably $10^{4.6}$ dPa·s or higher.

In the invention, glass surface devitrification viscosity $\eta_c$ can be determined in the following manner. That is, a glass surface devitrification temperature is determined by the above-described method and glass surface devitrification viscosity $\eta_c$ is determined by measuring glass viscosity at the glass surface devitrification temperature.

In the alkali-free glass according to the invention, the crystal growth rate is preferably 100 μm/hr or lower. In this case, a phenomenon can be prevented that the life of manufacturing facilities is shortened due to deposition of crystals in a flow passage of molten glass. Furthermore, the risk that deposited crystals are mixed into glass manufactured and become foreign matter defects becomes lower. Incidentally, even if they are extremely small, foreign matter defects mixed into glass possibly become an origin of fracture of the substrate in handling a large-size substrate such as a substrate one side of which measures 2400 mm or larger; lowering the crystal growth rate is therefore important.

In the invention, a crystal growth rate can be determined in the following manner. That is, pulverized glass particles are put into a platinum dish and then subjected to heat treatment for 17 hours in an electric furnace that is controlled around a surface devitrification temperature, thereby preparing plural primary crystal samples in which minute primary crystals are deposited in the glass surface. The produced primary crystal samples are held for 1-4 hours at temperatures having intervals 20° C. in such a temperature range that the glass viscosity becomes $10^4$-$10^6$ dPa·s, so that crystals are grown at each of the holding temperatures. Lengths of longest portions of crystal grains obtained before and after the holding at each holding temperature are measured, a difference between the crystal sizes obtained before and after the holding at each holding temperature is determined, and a crystal growth rate at each holding temperature is determined by dividing the crystal size difference by the holding time. In the invention, a maximum value of the growth rates in such a temperature range that the glass viscosity becomes $10^4$-$10^6$ dPa·s is employed as a crystal growth rate.

The crystal growth rate is more preferably 80 μm/hr or lower, more preferably 65 μm/hr or lower, particularly preferably 50 μm/hr or lower, and most preferably 40 μm/hr or lower.

In the alkali-free glass according to the invention, the density is preferably 2.8 g/cm³ or lower. In this case, self-weight gravity deflection becomes small and handling of a large-size substrate is made easier. Furthermore, the weight of a device using glass can be reduced. The density is more preferably 2.7 g/cm³ or lower, more preferably 2.68 g/cm³ or lower, more preferably 2.65 g/cm³ or lower, more preferably 2.63 g/cm³ or lower, and particularly preferably lower than 2.6 g/cm³. The term "large-size substrate" means, for example, a substrate at least one side of which is 2400 mm or longer.

In the alkali-free glass according to the invention, the specific modulus ((Young's modulus)/density) of glass is preferably 31 or larger. Increasing the specific modulus ((Young's modulus)/density) of glass makes it possible to prevent occurrence of trouble due to a warp of a large and thin glass substrate in a device manufacturing line. The specific modulus ((Young's modulus)/density)) of glass is preferably 31.5 or larger, more preferably 32 or larger, more preferably 32.2 or larger, more preferably 32.4 or larger, more preferably 32.6 or larger, particularly preferably 32.8 or larger, and most preferably 33 or larger.

In the alkali-free glass according to the invention, the average thermal expansion coefficient in a temperature range of 50-350° C. is preferably $30\times10^{-7}$/° C. or larger. For example, in manufacture of a TFT-side substrate of a flat panel display, there is a case where a gate metal film made of copper or so on, and a gate insulating film made of silicon nitride or so on are laid in order on alkali-free glass. In the case where the average thermal expansion coefficient in the temperature range of 50-350° C. is smaller than $30\times10^{-7}$/° C., thermal expansion coefficient differences from a gate metal film made of copper or so on that is formed on the substrate surface becomes so large as to cause trouble such as a warp of the substrate or film peeling.

The average thermal expansion coefficient in the temperature range of 50-350° C. is preferably $33\times10^{-7}$/° C. or larger, more preferably $35\times10^{-7}$/° C. or larger, more preferably $36\times10^{-7}$/° C. or larger, particularly preferably $37\times10^{-7}$/° C. or larger, and most preferably $38\times10^{-7}$/° C. or larger.

On the other hand, in the case where the average thermal expansion coefficient in the temperature range of 50-350° C. is larger than $45\times10^{-7}$/° C., breakage of glass may occur in a manufacturing process of a product such as a display. Thus, it is preferably $45\times10^{-7}$/° C. or smaller.

The average thermal expansion coefficient in the temperature range of 50-350° C. is preferably $43\times10^{-7}$/° C. or smaller, more preferably $42\times10^{-7}$/° C. or smaller, more preferably $41.5\times10^{-7}$/° C. or smaller, more preferably $41\times10^{-7}$/° C. or smaller, particularly preferably $40.5\times10^{-7}$/° C. or smaller, and most preferably $40.3\times10^{-7}$/° C. or smaller.

In the alkali-free glass according to the invention, the compaction that occurs when glass is held at 600° C. for 80 min is preferably 150 ppm or smaller. The term "compaction" means a ratio of glass thermal shrinkage that is caused by glass structure relaxation during heating treatment. In the case where the compaction is in the above range, dimensional variations that are caused by deformation and structure stabilization of glass when the glass is exposed to a high temperature in a thin-film forming process that is executed in manufacturing any of various displays can be minimized.

Compaction can be measured according to the following procedure. A glass plate sample (a sample of 100 mm (length)×10 mm (width)×1 mm (thickness) which is mirror-polished using cerium oxide) is held at a temperature that is a glass transition point+120° C. for 5 min and then cooled to room temperature at a rate of 40° C./min. A whole length L1 (in the length direction) of the sample is measured in this state. Subsequently, the sample is heated to 600° C. at a rate of 100° C./hr, held at 600° C. for 80 min, cooled to room temperature at a rate of 100° C./hr, a whole length L2 of the sample is measured again. A ratio (L1−L2)/L1, that is, a ratio of the difference (L1−L2) between the whole lengths before and after the heat treatment at 600° C. to the whole length L1 of the sample before the heat treatment at 600° C., is employed as a compaction value. The compaction value measured by the above evaluation method is more preferably 100 ppm or smaller, more preferably 90 ppm or smaller, more preferably 80 ppm or smaller, more preferably 75 ppm or smaller, particularly preferably 70 ppm or smaller, and most preferably 65 ppm or smaller. The absolute value of compaction is preferably close to 0 ppm. The smaller the absolute value of compaction is, the more preferable because thermal shrinkage of glass is less likely to occur.

In the alkali-free glass according to the invention, to decrease the compaction, the equivalent cooling rate is preferable set at 800° C./min or lower, for example. The definition and an evaluation method of the equivalent cooling rate are as follows. Glass that has been processed into a cuboid measuring 10 mm×10 mm×1 mm is held at a temperature that is a glass transition point+120° C. for 5 min using an infrared heating type electric furnace and then cooled to room temperature (25° C.). When the glass is cooled, plural glass samples are produced for which the cooling rate is varied in a range of 1° C./min to 1000° C./min. A refractive index $n_d$ of d line (wavelength: 587.6 nm) of each of these samples is measured by a V block method using a precision refractometer KPR-2000 produced by Shimadzu Device Corporation. Thus-obtained $n_d$ values are plotted with respect to the above-mentioned cooling rate (logarithmic scale), whereby an $n_d$ calibration curve with respect to the cooling rate is obtained. Subsequently, an $n_d$ value of glass that has been melted in an electric furnace, formed, and cooled actually is measured by the above method. A cooling rate corresponding to the $n_d$ value thus obtained (in the invention, called an "equivalent cooling rate") can be obtained from the above calibration curve.

The equivalent cooling rate is preferably 5° C./min or higher and 800° C./min or lower from the viewpoint of a balance between compaction and productivity. From the viewpoint of productivity, the equivalent cooling rate is more preferably 10° C./min or higher, more preferably 15° C./min or higher, particularly preferably 20° C./min or higher, and most preferably 25° C./min or higher. From the viewpoint of compaction, the equivalent cooling rate is more preferably 500° C./min or lower, more preferably 300° C./min or lower, more preferably 200° C./min or lower, particularly preferably 150° C./min or lower, and most preferably 100° C./min or lower.

In the alkali-free glass according to the invention, the sludge volume at the time of etching treatment is preferably 30 ml or smaller. In the case where the sludge volume at the time of etching treatment is in the above range, a phenomenon that sludge produced during etching treatment sticks to the glass surface again is prevented, and the surface can be treated uniformly. As a result, a glass product that is superior in surface roughness and surface flatness can be obtained. Furthermore, a glass product that is superior in surface cleanliness can be obtained. The sludge volume is more preferably 20 ml or smaller, more preferably 15 ml or smaller, more preferably 12 ml or smaller, particularly preferably 10 ml or smaller, and most preferably 8 ml or smaller.

In the invention, a sludge volume at the time of etching treatment can be determined in the following manner.

A mass of an alkali-free glass substrate 1 which has a thickness of 0.5 mm and has been cut into 20 mm×30 mm is measured after being cleaned and dried. An aqueous solution (liquid chemical) adjusted so as to contain 5 mass % hydrofluoric acid and 2 mass % hydrochloric acid is put into a container made of Teflon (registered trademark) and held at 40° C. using a constant temperature bath. The entire alkali-free glass substrate 1 is immersed in the liquid chemical and melted completely. To compensate for hydrofluoric acid consumed by the etching, 1.8 ml of 50 mass % hydrofluoric acid is added to the above liquid chemical. Then, a new alkali-free glass substrate 2 of 20 mm×30 mm×0.5 mm (thickness) is immersed in the liquid chemical and also melted completely. Furthermore, 1.8 ml of 50 mass % hydrofluoric acid is added to the liquid chemical, a new alkali-free glass substrate 3 of 20 mm×30 mm×0.5 mm (thickness) is immersed in the liquid chemical and melted completely according to the same procedure. The liquid chemical in which the alkali-free glass substrates have been melted is held for one day and night (24 hours) while being stirred by a magnetic stirrer, thereby producing sludge (insoluble matter) in the liquid chemical. To prevent evaporation of the liquid chemical, a lid made of Teflon (registered trademark) is put on the container during the test. Subsequently, the liquid chemical and sludge contained in the container made of Teflon (registered trademark) are transferred to a graduated cylinder and held for 24 hours to precipitate sludge. A volume of the sludge is measured using the scale of the graduated cylinder and employed as a sludge volume.

In the alkali-free glass according to the invention, the etching rate of etching treatment is preferably 5.5 µm/min or lower. If the etching treatment speed is too high, it may become difficult to control the etching treatment, which may cause a problem such as worsening of the surface roughness of a glass plate. The etching rate is more preferably 5.0 µm/min or lower, more preferably 4.5 µm/min or lower, particularly preferably 4.2 µm/min or lower, most preferably 4.0 µm/min or lower.

The etching rate of etching treatment is preferably 2.40 µm/min or higher. In the case where the etching rate of etching treatment is in the above range, the etching treatment speed falls within a realistic range. The etching rate of etching treatment is more preferably 2.50 µm/min or higher, more preferably 2.70 µm/min or higher, particularly preferably 2.90 µm/min or higher, and most preferably 3.00 µm/min or higher.

In the invention, an etching rate of etching treatment can be determined in the following manner.

A mass of an alkali-free glass substrate which has a thickness of 0.5 mm and has been cut into 20 mm×30 mm is measured after being cleaned and dried. An aqueous solution (liquid chemical) adjusted so as to contain 5 mass % hydrofluoric acid and 2 mass % hydrochloric acid is put into a container made of Teflon (registered trademark) and held at 40° C. using a constant temperature bath. The entire alkali-free glass substrate is immersed in the liquid chemical for 20 minutes. After the immersed alkali-free glass substrate is cleaned by pure water and dried, a mass of the glass substrate is measured. An etching rate per unit time is calculated by calculating a surface area using the dimensions of the sample, dividing a mass reduction by a density, dividing a resulting quotient by the surface area, and then dividing a resulting quotient by the immersion time.

In the alkali-free glass according to the invention, the annealing point is preferably 850° C. or lower. In the case where the annealing point is 850° C. or lower, the load on manufacturing facilities can be lowered. For example, the surface temperature of rollers used for glass forming can be lowered, so that the life of facilities can be elongated and the productivity can be increased. The annealing point is more preferably 820° C. or lower, more preferably 810° C. or lower, more preferably 800° C. or lower, particularly preferably 790° C. or lower, and most preferably 780° C. or lower. The annealing point is preferably 700° C. or higher.

In the alkali-free glass according to the invention, the glass transition point is preferably 850° C. or lower. In the case where the glass transition point is 850° C. or lower, the load on manufacturing facilities can be lowered. For example, the surface temperature of rollers used for glass forming can be lowered, so that the life of facilities can be elongated and the productivity can be increased. The glass transition point is more preferably 820° C. or lower, more preferably 810° C. or lower, more preferably 800° C. or lower, particularly preferably 790° C. or lower, most preferably 780° C. or lower. The glass transition point is preferably 690° C. or higher.

In the alkali-free glass according to the invention, the photoelastic constant is preferably 31 nm/MPa/cm or smaller.

In some cases, stress that occurs in a liquid crystal display manufacturing process and during use of a liquid crystal display device causes a glass substrate to exhibit birefringence, as a result of which a display in black turns gray, and thus the contrast of the liquid crystal display is lowered. This phenomenon can be prevented if the photoelastic constant is 31 nm/MPa/cm or smaller. The photoelastic constant is more preferably 30 nm/MPa/cm or smaller, more preferably 29 nm/MPa/cm or smaller, more preferably 28.5 nm/MPa/cm or smaller, and particularly preferably 28 nm/MPa/cm or smaller.

Taking into consideration the ease of ensuring other physical properties, the photoelastic constant is preferably 23 nm/MPa/cm or larger, more preferably 25 nm/MPa/cm or larger. A photoelastic constant can be measured at a measurement wavelength 546 nm by a disc compression method.

The alkali-free glass according to the invention is suitable for use as a glass plate that is used as a large-size substrate because its Young's modulus is preferably so large as 82.5 GPa or larger that the degree of deformation of a substrate with respect to external stress is reduced and the crystal growth rate is so low that mixing of foreign matter to possibly become an origin of breakage of a substrate is prevented. The term "large-size substrate" means, for example, a substrate at least one side of which is 2400 mm or longer. A specific example is a glass plate whose longer side is 2400 mm or longer and shorter side is 2000 mm or longer.

The alkali-free glass according to the invention is more suitable for a glass plate at least one side of which is 2400 mm or longer, for example, a glass plate whose longer side is 2400 mm or longer and shorter side is 2100 mm or longer, even more suitable for a glass plate at least one side of which is 3000 mm or longer, for example, a glass plate whose longer side is 3000 mm or longer and shorter side is 2800 mm or longer, particularly suitable for a glass plate at least one side of which is 3200 mm or longer, for example, a glass plate whose longer side is 3200 mm or longer and shorter side is 2900 mm or longer, and most suitable for a glass plate at least one side of which is 3300 mm or longer, for example, a glass plate whose longer side is 3300 mm or longer and shorter side is 2950 mm or longer.

A glass plate according to the invention the thickness of which is 1.0 mm or smaller is preferable because it enables weight reduction. In the alkali-free glass according to the invention, the thickness is more preferably 0.7 mm or smaller, more preferably 0.65 mm or smaller, more preferably 0.55 mm or smaller, more preferably 0.45 mm or smaller, and most preferably 0.4 mm or smaller. The thickness can be 0.1 mm or smaller or 0.05 mm or smaller. However, from the viewpoint of preventing self-weight gravity deflection, the thickness is preferably 0.1 mm or larger, more preferably 0.2 mm or larger.

A glass plate including alkali-free glass according to the invention can be manufactured according to the following procedure, for example.

Raw materials of above-described components are mixed so as to have target contents in a glass composition, respectively, and put into a melting furnace, where they are melted by being heated to 1500-1800° C., thereby obtaining molten glass. The molten glass thus obtained is formed into a glass ribbon having a predetermined thickness, which is annealed and cut into glass plates.

In the alkali-free glass according to the invention, a manufacturing method for decreasing the compaction can be employed. More specifically, the equivalent cooling rate is preferably 500° C./min or lower, for example. In this connection, the definition and an evaluation method of an equivalent cooling rate are as follows. Glass that has been processed into a cuboid of 10 mm×10 mm×1 mm is held at a temperature that is a glass transition point+120° C. for 5 minutes using an infrared heating type electric furnace and then cooled to room temperature (25° C.). When the glass is cooled, plural glass samples are produced for which the cooling rate is varied in a range of 1° C./min to 1000° C./min. A refractive index $n_d$ of d line (wavelength: 587.6 nm) of each of these samples is measured by a V block method using a precision refractometer KPR-2000 produced by Shimadzu Device Corporation. Thus-obtained $n_d$ values are plotted with respect to the above-mentioned cooling rate (logarithmic scale), thereby obtaining an $n_d$ calibration curve with respect to the cooling rate. Subsequently, an $n_d$ value of glass that has been subjected to such processes as melting, forming, and cooling in an actual manufacturing line is measured by the above method. A cooling rate corresponding to the $n_d$ value thus obtained (in the invention, called an "equivalent cooling rate") can be obtained from the above calibration curve.

The equivalent cooling rate during annealing of a glass ribbon is preferably 5° C./min or higher and 500° C./min or lower from the viewpoint of a balance between compaction and productivity, more preferably 10° C./min or higher and 300° C./min or lower, more preferably 15° C./min or higher and 100° C./min or lower.

In the invention, it is preferable that molten glass be formed into a glass plate by a float process, a fusion process, or the like.

Next, a display panel according to the invention will be described.

The display panel according to the invention includes the above-described alkali-free glass as a glass substrate. There are no particular limitations on the display panel except that it includes the alkali-free glass according to the invention; the display panel may be any of various display panels such as a liquid crystal display panel, an organic EL display panel, an LED (light-emitting diode) display panel. In each kind of display panel, the glass substrate of the alkali-free glass according to the invention may be provided with a drive circuit, a scanning circuit, or the like using thin-film transistors (TFTs).

Take a thin-film transistor liquid crystal display (TFT-LCD) as an example. It is equipped with a display surface electrode substrate (array substrate) in which gate electrode lines and a gate insulating oxide layer are formed on its surface and pixel electrodes are formed on the surface of the oxide layer and a color filter substrate in which RGB color filters and counter electrodes are formed on its surface. Cells are formed in such a manner that a liquid crystal material is sandwiched between the array substrate and the color filter substrate that are paired with each other. The liquid crystal display panel includes other elements such as peripheral circuits in addition to those cells. The liquid crystal display panel according to the invention employs the alkali-free glass according to the invention in at least one of the pair of substrates that constitute the cells.

Next, a semiconductor device according to the invention includes the above-described alkali-free glass according to the invention as a glass substrate, more specifically, as a glass substrate for a MEMS, CMOS, CTS, or like image sensor. For another example, a semiconductor device according to the invention includes the alkali-free glass according to the invention as a cover glass for a projection-use display device such as a cover glass of a LCOS (liquid crystal on silicon) device.

An information recording device according to the invention includes the above-described alkali-free glass according to the invention as a glass substrate, more specifically, as a glass substrate for a magnetic recording medium, an optical disc, or the like. Examples of magnetic recording media include an energy assisted magnetic recording medium and a vertical magnetic recording medium.

A planar antenna according to the invention includes the above-described alkali-free glass according to the invention as a glass substrate, more specifically, as a glass substrate for an antenna that is high in directivity and reception sensitivity such as a planar liquid crystal antenna having a planar shape examples of which include a liquid crystal antenna and a microstrip antenna (patch antenna). For example, WO 2018/016398 discloses a liquid crystal antenna. For example, patent application publications JP 2017-509266 A and JP 2017-063255 A disclose a patch antenna.

In a planar antenna, the alkali-free glass according to the invention constitutes an antenna installation substrate or a protection material, for example. The protection material can prevent deterioration of an antenna function due to exposure to ultraviolet light, moisture (water vapor), or water and damaging or destruction of the antenna function due to mechanical contact.

A planar antenna having the alkali-free glass according to the invention is more suitable for antennas for transmitting and receiving radio waves in a radio wave band because the planar antenna can prevent radiation efficiency reduction due to alkali components and can also prevent damaging and braking because of a large Young's modulus.

"Radio waves in a radio frequency band" means radio waves in a radio wave band (e.g., 0.3-300 GHz) of microwaves, millimeter waves, etc. that includes radio waves in a frequency band of 3.6-29.5 GHz including radio frequency bands for fifth generation mobile communication systems (5G) (e.g., 3.7 GHz band (3.6-4.2 GHz)), a 4.5 GHz band (4.4-4.9 GHz), and a 28 GHz band (27.5-29.5 GHz).

For example, WO 2019/026963 and WO 2019/107514 disclose antennas capable of receiving radio waves in a radio frequency band.

A dimming laminate according to the invention includes the above-described alkali-free glass according to the invention as a glass substrate. For example, the "dimming laminate" is a dimming laminate (also called a dimming device or a dimming glass) that is equipped with a dimming function material for controlling the light transmission state by an electrical control. Capable of shielding or freeing the field of view of a user or controlling the inflow of infrared light, the dimming laminate can be used as a room partitioning material, a construction material of, for example, an outside window, a video display screen, etc. For example, WO 2017/213191 and JP 2017-90617 A disclose dimming laminates.

A vehicular window glass according to the invention includes the above-described alkali-free glass according to the invention as a glass plate. Enabling stable transmission and reception of radio waves stably in a radio frequency band and not being prone to be damaged or broken as described above, the vehicular window glass having the alkali-free glass according to the invention is suitable for a window glass of an autonomous driving vehicle.

An acoustic vibration plate according to the invention includes the above-described alkali-free glass according to the invention as a glass substrate. Having a large Young's modulus, the alkali-free glass according to the invention is suitable for acoustic uses. For example, WO 2019/070007, WO 2018/181626, and JP 2019-68368 A disclose acoustic vibration plates.

EXAMPLES

Although Examples will be described below, the invention is not limited to those Examples. In the following, Examples 1-5 and Examples 9-13 are Inventive Examples and Examples 6-8 and Examples 14-16 are Comparative Examples.

Raw materials of respective components were mixed so as to obtain a target glass composition (unit: mol %) of each of Examples 1-16 and melted at 1600° C. for one hour using a platinum crucible. After the melting, a molten liquid was caused to flow out onto a carbon plate, held at a temperature that is a glass transition point+30° C. for 60 minutes, and cooled to room temperature (25° C.) at a rate of 1° C. per minute thereby obtaining plate-like glass. A glass plate was obtained by mirror-polishing the plate-like glass and subjected to various evaluations. Results are shown in Tables 1 and 2. In Tables 1 and 2, each value shown in parentheses is a calculated value or an estimated value. In Tables 1 and 2, "RO" means a total content of alkali earth metal oxides.

Measurement methods of respective physical properties will be described below.
(Average Thermal Expansion Coefficient)

A measurement was carried out using a differential thermal dilatometer (TMA) according to a method that is prescribed in JIS R3102 (year 1995). The measurement temperature range was room temperature to 400° C. or higher and an average thermal expansion coefficient in a temperature range 50-350° C. is shown in the unit $(\times 10^{-7})/°C$.
(Density)

A measurement was performed on a lump of glass in an amount of about 20 g not containing bubbles by a liquid weighing method according to a method that is prescribed in JIS Z 8807 (year 2012).
(Strain Point)

A measurement was carried out by a fiber elongation method according to a method that is prescribed in JIS R3103-2 (year 2001).
(Annealing Point)

A measurement was carried out by a fiber elongation method according to a method that is prescribed in JIS R3103-2 (year 2001).
(Glass Transition Point)

A measurement was carried out by a thermal expansion method according to a method that is prescribed in JIS R3103-3 (year 2001).

(Young's Modulus)

A measurement was performed on glass that was 1.0-10 mm in thickness by an ultrasonic pulse method according to a method that is prescribed in JIS R 1602 (year 1995).

($T_2$)

Viscosity was measured using a rotary viscometer and a temperature at which the viscosity becomes $10^2$ dPa·s was measured according to a method that is prescribed in ASTM C 965-96 (year 2017).

($T_4$) Viscosity was measured using a rotary viscometer and a temperature at which the viscosity becomes $10^4$ dPa·s was measured according to a method that is prescribed in ASTM C 965-96 (year 2017).

(Surface Devitrification Temperature $T_c$)

Glass was pulverized and classification was performed using a test sieve so as to obtain particles in a diameter range of 2-4 mm. The glass cullet thus obtained was subjected to ultrasonic cleaning in isopropyl alcohol for five minutes, cleaned using ion exchanged water, dried, put into a platinum dish, and then subjected to heat treatment for 17 hours in an electric furnace that was controlled at a constant temperature. Heat treatment temperatures were set at intervals of 10° C.

After the heat treatment, the glass was removed from the platinum dish and a maximum temperature at which crystals were deposited in the glass surface and a minimum temperature at which no crystals were deposited were determined through observation using an optical microscope.

Each of a maximum temperature at which crystals were deposited in the glass surface and a minimum temperature at which no crystals were deposited was measured once. In the case where it was difficult to judge whether crystals were deposited, measurement was possibly done two times.

An average value of the measured maximum temperature at which crystals were deposited in the glass surface and the measured minimum temperature at which no crystals were deposited was determined as a glass surface devitrification temperature $T_c$.

(Surface Devitrification Viscosity $\eta_c$) A glass surface devitrification temperature $T_c$ was determined by the above method and glass surface devitrification viscosity $\eta_c$ was determined by measuring glass viscosity at the glass surface devitrification temperature $T_c$.

(Internal Devitrification Temperature $T_d$)

Glass was pulverized and classification was performed using a test sieve so as to obtain particles in a diameter range of 2-4 mm. The glass cullet thus obtained was subjected to ultrasonic cleaning in isopropyl alcohol for five minutes, cleaned using ion exchanged water, dried, put into a platinum dish, and then subjected to heat treatment for 17 hours in an electric furnace that was controlled at a constant temperature. Heat treatment temperatures were set at intervals of 10° C.

After the heat treatment, the glass was removed from the platinum dish and a maximum temperature at which crystals were deposited in the glass surface and a minimum temperature at which no crystals were deposited were determined through observation using an optical microscope.

Each of a maximum temperature at which crystals were deposited inside the glass and a minimum temperature at which no crystals were deposited was measured once. In the case where it was difficult to judge whether crystals were deposited, measurement was possibly done two times.

An average value of the measured maximum temperature at which crystals were deposited inside the glass and the measured minimum temperature at which no crystals were deposited was determined as a glass internal devitrification temperature $T_d$.

(Internal Devitrification Viscosity $\eta_d$)

A glass internal devitrification temperature $T_d$ was determined by the above method and glass internal devitrification viscosity $\eta_d$ was determined by measuring glass viscosity at the glass internal devitrification temperature $T_d$.

(Crystal Growth Rate)

Pulverized glass particles are put into a platinum dish and heat-treated for 17 hours in an electric furnace that is controlled around a surface devitrification temperature, thereby producing plural primary crystal samples in which minute primary crystals are deposited in the glass surface. The produced primary crystal samples are held for 1-4 hours at temperatures having intervals 20° C. in such a temperature range that the glass viscosity is $10^4$-$10^6$ dPa·s, thereby growing crystals at the respective holding temperatures. Lengths of longest portions of crystal grains obtained before and after the holding at each holding temperature were measured, a difference between the crystal sizes obtained before and after the holding at each holding temperature was determined, and a crystal growth rate at each holding temperature was determined by dividing the crystal size difference by the holding time. A maximum value of the growth rates in such a temperature range that the glass viscosity became $10^4$-$10^6$ dPa·s was employed as a crystal growth rate.

(Etching Rate)

Raw materials of respective components were mixed so as to obtain each of target glass compositions shown in Tables 1 and 2, melted in an electric furnace, and clarified, thereby obtaining each alkali-free glass base material. Each alkali-free glass base material was mirror-polished, cut into an alkali-free glass substrate 1 of 20 mm×30 mm×0.5 mm (thickness), cleaned, dried, and subjected to a mass measurement.

An aqueous solution (liquid chemical) adjusted so as to contain 5 mass % hydrofluoric acid and 2 mass % hydrochloric acid was put into a container made of Teflon (registered trademark) and held at 40° C. using a constant temperature bath. The entire alkali-free glass substrate was immersed in the liquid chemical for 20 minutes. The immersed alkali-free glass substrate was cleaned by pure water and dried, and then subjected to a mass measurement.

A surface area was calculated from the sample dimensions and an etching rate per unit time was calculated by dividing, by the surface area, a quotient obtained by dividing a mass reduction by a density and then dividing a resulting quotient by the immersion time.

(Sludge Volume)

The entire alkali-free glass substrate 1 that was used for calculating an etching rate was again immersed in the liquid chemical of 40° C. and melted completely. After 1.8 ml of 50 mass % hydrofluoric acid was added to the above liquid chemical to compensate for hydrofluoric acid consumed by the etching, a new alkali-free glass substrate 2 of 20 mm×30 mm×0.5 mm (thickness) was immersed in the liquid chemical and also melted completely.

Furthermore, after 1.8 ml of 50 mass % hydrofluoric acid was added to the above liquid chemical, a new alkali-free glass substrate 3 of 20 mm×30 mm×0.5 mm (thickness) was immersed in the liquid chemical and melted completely according to the same procedure. The liquid chemical in which the alkali-free glass substrate 3 had been melted was held for one day and night (24 hours) while being stirred by a magnetic stirrer, thereby producing sludge (insoluble matter) in the liquid chemical. To prevent evaporation of the liquid chemical, a lid made of Teflon (registered trademark) was put on the container during the test. Subsequently, the liquid chemical and sludge contained in the container made of Teflon (registered trademark) were transferred to a graduated cylinder and held for 24 hours to precipitate sludge. A volume of the sludge was measured using the scale of the graduated cylinder and employed as a sludge volume.

(Specific Modulus)

The specific modulus is determined by dividing the Young's modulus determined in the above-described procedure by the density.

TABLE 1

| | mol % | | | | | | | |
|---|---|---|---|---|---|---|---|---|
| | Ex. 1 | Ex. 2 | Ex. 3 | Ex. 4 | Ex. 5 | Ex. 6 | Ex. 7 | Ex. 8 |
| $SiO_2$ | 68.7 | 68.4 | 69.5 | 70.0 | 65.0 | 68.5 | 65.8 | 64.2 |
| $Al_2O_3$ | 11.5 | 13.2 | 12.5 | 12.0 | 12.7 | 12.1 | 9.8 | 14.0 |
| $B_2O_3$ | 1.8 | 2.1 | 2.7 | 1.2 | 2.6 | 3.0 | 2.8 | 1.5 |
| MgO | 8.4 | 7.8 | 7.5 | 7.7 | 9.6 | 6.5 | 11.3 | 9.7 |
| CaO | 5.0 | 4.8 | 3.8 | 4.5 | 5.8 | 3.3 | 7.2 | 4.2 |
| SrO | 1.8 | 3.2 | 2.3 | 3.0 | 3.8 | 3.3 | 3.1 | 6.4 |
| BaO | 2.8 | 0.5 | 1.7 | 1.6 | 0.5 | 3.3 | 0.0 | 0.0 |
| RO | 18.0 | 16.3 | 15.3 | 16.8 | 19.7 | 16.4 | 21.6 | 20.3 |
| MgO/CaO | 1.68 | 1.63 | 1.97 | 1.71 | 1.66 | 1.97 | 1.57 | 2.31 |
| Value of formula (A) | 83.9 | 85.0 | 82.7 | 84.3 | 86.7 | 81.1 | 86.4 | 88.6 |
| Value of formula (B) | 720 | 725 | 723 | 732 | 704 | 715 | 688 | 714 |
| Value of formula (C) | −17.9 | 28.2 | −16.7 | −30.5 | 74.6 | −9.7 | −14.7 | 110.3 |
| Value of formula (D) | 7.50 | 6.81 | 2.11 | 6.09 | 15.86 | 8.55 | 11.72 | 22.17 |
| Value of formula (E) | 3.41 | 3.43 | 2.83 | 2.75 | 5.11 | 3.87 | 4.00 | 5.96 |
| Average thermal expansion coefficient ($\times 10^{-7}/°$ C.) | 38.8 | 36.0 | 35.5 | 37.2 | 41.5 | (38.9) | 40.9 | (41.8) |
| Density (g/cm$^3$) | 2.59 | 2.54 | 2.54 | 2.57 | 2.57 | (2.61) | 2.56 | (2.63) |
| Strain point (° C.) | 706 | 716 | 710 | 715 | 712 | (713) | 681 | (714) |
| Annealing point (° C.) | 762 | 772 | 767 | 773 | 760 | (763) | (733) | (764) |
| Glass transition point (° C.) | 755 | 769 | 763 | 769 | (760) | (767) | 728 | (772) |
| Young's modulus (GPa) | 84.2 | 86.1 | 83.4 | 84.3 | 85.0 | (81) | 86.4 | (89) |
| $T_2$ (° C.) | 1692 | 1688 | 1721 | 1733 | 1612 | (1709) | 1601 | (1609) |
| $T_4$ (° C.) | 1321 | 1323 | 1339 | 1349 | 1268 | (1334) | 1248 | (1274) |
| Surface devitrification temp. $T_c$ (° C.) | 1245 | 1295 | 1305 | 1265 | — | — | 1275 | — |
| Internal devitrification temp. $T_d$ (° C.) | 1195 | 1255 | 1225 | 1235 | — | — | — | — |
| Surface devitrification viscosity $\eta_c$ (dPa · s) | $10^{4.6}$ | $10^{4.2}$ | $10^{4.3}$ | $10^{4.7}$ | — | — | $10^{3.8}$ | — |
| Internal devitrification viscosity $\eta_d$ (dPa · s) | $10^{5.1}$ | $10^{4.6}$ | $10^{4.9}$ | $10^{5.0}$ | — | — | — | — |
| Crystal growth rate (µm/hr) | (≤100) | (≤100) | (≤100) | (≤100) | (≤100) | (≤100) | (≤100) | (>100) |
| Sludge volume (ml) | (≤30) | (≤30) | (≤30) | (≤30) | (≤30) | (≤30) | (≤30) | (>30) |
| Etching rate (µm/min) | (2-4.5) | (2-4.5) | (2-4.5) | (2-4.5) | (2-4.5) | (2-4.5) | (2-4.5) | (>4.5) |
| Photoelastic constant (nm/MPa/cm) | (27.5) | (27.9) | (28.5) | (27.7) | (27.1) | (28.1) | (27.7) | (26.1) |
| Specific modulus (MN · m/kg) | 32.5 | 33.9 | 32.8 | 32.8 | 33.1 | (31.1) | 33.8 | (33.7) |
| Equivalent cooling rate (° C./min) | 40 | 40 | 40 | 40 | 40 | 40 | 40 | 40 |
| Compaction (ppm) | (≤100) | (≤100) | (≤100) | (≤100) | (≤100) | (≤100) | (>100) | (≤100) |

TABLE 2

| | mol % | | | | | | | |
|---|---|---|---|---|---|---|---|---|
| | Ex. 9 | Ex. 10 | Ex. 11 | Ex. 12 | Ex. 13 | Ex. 14 | Ex. 15 | Ex. 16 |
| $SiO_2$ | 68.5 | 67.7 | 69.1 | 69.5 | 64.5 | 68.0 | 65.4 | 64.1 |
| $Al_2O_3$ | 11.5 | 13.1 | 12.4 | 11.9 | 12.6 | 12.0 | 9.8 | 13.9 |
| $B_2O_3$ | 1.8 | 2.1 | 2.7 | 1.2 | 2.6 | 3.0 | 2.8 | 1.5 |
| MgO | 8.4 | 7.7 | 7.5 | 7.7 | 9.5 | 6.5 | 11.3 | 9.7 |
| CaO | 5.0 | 4.8 | 3.8 | 4.5 | 5.8 | 3.3 | 7.2 | 4.2 |
| SrO | 1.8 | 3.2 | 2.3 | 3.0 | 3.8 | 3.3 | 3.1 | 6.4 |
| BaO | 2.8 | 0.5 | 1.7 | 1.6 | 0.5 | 3.3 | 0.0 | 0.0 |
| $Li_2O$ | 0.00 | 0.00 | 0.00 | 0.02 | 0.00 | 0.02 | 0.00 | 0.00 |
| $Na_2O$ | 0.02 | 0.03 | 0.08 | 0.02 | 0.05 | 0.06 | 0.03 | 0.08 |
| $K_2O$ | 0.00 | 0.00 | 0.01 | 0.00 | 0.00 | 0.00 | 0.00 | 0.05 |
| F | 0.00 | 0.33 | 0.17 | 0.00 | 0.17 | 0.00 | 0.33 | 0.00 |
| Cl | 0.10 | 0.53 | 0.18 | 0.35 | 0.35 | 0.00 | 0.00 | 0.00 |
| $SnO_2$ | 0.00 | 0.00 | 0.00 | 0.10 | 0.00 | 0.15 | 0.00 | 0.08 |
| $SO_3$ | 0.00 | 0.00 | 0.00 | 0.00 | 0.00 | 0.00 | 0.00 | 0.00 |
| $As_2O_3$ | 0.00 | 0.00 | 0.00 | 0.00 | 0.06 | 0.00 | 0.00 | 0.00 |
| $Sb_2O_3$ | 0.00 | 0.00 | 0.00 | 0.00 | 0.00 | 0.02 | 0.00 | 0.00 |
| $P_2O_5$ | 0.00 | 0.00 | 0.00 | 0.00 | 0.00 | 0.00 | 0.00 | 0.00 |
| $ZrO_2$ | 0.03 | 0.03 | 0.01 | 0.10 | 0.03 | 0.10 | 0.04 | 0.00 |
| ZnO | 0.00 | 0.00 | 0.00 | 0.00 | 0.00 | 0.23 | 0.00 | 0.00 |
| $Fe_2O_3$ | 0.01 | 0.00 | 0.02 | 0.02 | 0.04 | 0.02 | 0.02 | 0.01 |
| β-OH (/mm) | 0.25 | 0.30 | 0.25 | 0.40 | 0.05 | 0.10 | 0.45 | 0.15 |
| RO | 18.0 | 16.3 | 15.3 | 16.8 | 19.7 | 16.4 | 21.6 | 20.3 |

TABLE 2-continued

|  | mol % | | | | | | | |
|---|---|---|---|---|---|---|---|---|
|  | Ex. 9 | Ex. 10 | Ex. 11 | Ex. 12 | Ex. 13 | Ex. 14 | Ex. 15 | Ex. 16 |
| MgO/CaO | 1.68 | 1.63 | 1.97 | 1.71 | 1.66 | 1.97 | 1.57 | 2.31 |
| Value of formula (A) | 83.9 | 85.0 | 82.7 | 84.3 | 86.7 | 81.1 | 86.4 | 88.6 |
| Value of formula (B) | 720 | 725 | 723 | 732 | 704 | 715 | 688 | 714 |
| Value of formula (C) | −17.9 | 28.2 | −16.7 | −30.5 | 74.6 | −9.7 | −14.7 | 110.3 |
| Value of formula (D) | 7.50 | 6.81 | 2.11 | 6.09 | 15.86 | 8.55 | 11.72 | 22.17 |
| Value of formula (E) | 3.41 | 3.43 | 2.83 | 2.75 | 5.11 | 3.87 | 4.00 | 5.96 |
| Average thermal expansion coefficient ($\times 10^{-7}/°$ C.) | 38.8 | (36.0) | (35.5) | (37.2) | (41.5) | (38.9) | (40.9) | (41.8) |
| Density (g/cm$^3$) | 2.59 | (2.54) | (2.54) | (2.57) | (2.57) | (2.61) | (2.56) | (2.63) |
| Strain point (° C.) | 706 | (713) | (705) | (713) | (709) | (708) | (678) | (705) |
| Annealing point (° C.) | 762 | (769) | (762) | (771) | (757) | (758) | (730) | (755) |
| Glass transition point (° C.) | 755 | (766) | (758) | (767) | (757) | (762) | (725) | (767) |
| Young's modulus (GPa) | 84.2 | (86) | (83) | (84) | (85) | (81) | (86) | (89) |
| $T_2$ (° C.) | 1692 | (1688) | (1721) | (1733) | (1612) | (1709) | (1601) | (1608) |
| $T_4$ (° C.) | 1321 | (1323) | (1339) | (1349) | (1268) | (1334) | (1248) | (1273) |
| Surface devitrification temp. $T_c$ (° C.) | 1245 | (1295) | (1305) | (1265) | — | — | (1275) | — |
| Internal devitrification temp. $T_d$ (° C.) | 1195 | (1255) | (1225) | (1235) | — | — | — | — |
| Surface devitrification viscosity $\eta_c$ (dPa·s) | ($10^{4.6}$) | ($10^{4.2}$) | ($10^{4.3}$) | ($10^{4.7}$) | — | — | ($10^{3.8}$) | — |
| Internal devitrification viscosity $\eta_d$ (dPa·s) | ($10^{5.1}$) | ($10^{4.6}$) | ($10^{4.9}$) | ($10^{5.0}$) | — | — | — | — |
| Crystal growth rate (μm/hr) | (≤100) | (≤100) | (≤100) | (≤100) | (≤100) | (≤100) | (≤100) | (>100) |
| Sludge volume (ml) | (≤30) | (≤30) | (≤30) | (≤30) | (≤30) | (≤30) | (≤30) | (>30) |
| Etching rate (μm/min) | (2-4.5) | (2-4.5) | (2-4.5) | (2-4.5) | (2-4.5) | (2-4.5) | (2-4.5) | (>4.5) |
| Photoelastic constant (nm/MPa/cm) | (27.5) | (27.9) | (28.5) | (27.7) | (27.1) | (28.1) | (27.7) | (26.1) |
| Specific modulus (MN·m/kg) | 32.5 | (33.9) | (32.8) | (32.8) | (33.1) | (31.1) | (33.8) | (33.7) |
| Equivalent cooling rate (° C./min) | 40 | 40 | 40 | 40 | 40 | 40 | 40 | 40 |
| Compaction (ppm) | (≤100) | (≤100) | (≤100) | (≤100) | (≤100) | (≤100) | (>100) | (≤100) |

In Examples 1-5 and Examples 9-13 in which the value of Formula (A) was 82.5 or larger, the Young's modulus was 83 GPa or larger. On the other hand, in Examples 6 and 14 in which the value of Formula (A) was smaller than 82.5, the Young's modulus was smaller than 83 GPa.

In Examples 1-5 and Examples 9-13 in which the value of Formula (B) was 690 or larger and 800 or smaller, the strain point was 690° C. or higher. In Examples 7 and 15 in which the value of Formula (B) was smaller than 690, the strain point was lower than 690° C.

In Examples 1-5 and Examples 9-13 in which the value of Formula (C) was 100 or smaller, the crystal growth rate was 100 μm/hr or lower. On the other hand, in Examples 8 and 16 in which the value of Formula (C) was larger than 100, the crystal growth rate was higher than 100 μm/hr.

In Examples 1-5 and Examples 9-13 in which the value of Formula (D) was 20 or smaller, the sludge volume was 30 ml or smaller. On the other hand, in Examples 8 and 16 in which the value of Formula (D) was larger than 20, the sludge volume was larger than 30 ml.

In Examples 1-5 and Examples 9-13, the surface devitrification viscosity $\eta_c$ was $10^{4.2}$ dPa·s or higher. In Examples 7 and 15, the surface devitrification viscosity $\eta_c$ was lower than $10^{4.2}$ dPa·s.

Although the invention has been described in detail with reference to the particular embodiments, it is apparent to those skilled in the art that various changes and modifications are possible without departing from the spirit and scope of the invention.

The present application is based on Japanese Patent Application No. 2019-20257 filed on Feb. 7, 2019, Japanese Patent Application No. 2019-51570 filed on Mar. 19, 2019, Japanese Patent Application No. 2019-141422 filed on Jul. 31, 2019, Japanese Patent Application No. 2019-186805 filed on Oct. 10, 2019, and Japanese Patent Application No. 2020-17692 filed on Feb. 5, 2020, the disclosures of which are incorporated herein by reference.

INDUSTRIAL APPLICABILITY

The alkali-free glass according to the invention having the above-described features are suitable for uses such as substrates for displays, substrates for photomasks, substrates for supporting electronic devices, substrates for information recording media, substrates for planar antennas, substrates for dimming laminates, vehicular window glasses, acoustic vibration plates.

The invention claimed is:

1. An alkali-free glass, comprising, in mol % in terms of oxides:
$SiO_2$: 63-75%;
$Al_2O_3$: 10-16%;
$B_2O_3$: 1.7-5%;
MgO: 0.1-15%;
CaO: 0.1-12%;
SrO: 0-8%; and
BaO: 1.6-6%,
wherein:
[MgO]/[CaO] is larger than 1.5;
a value of Formula (A) is 82.5 or larger, Formula (A) being 1.131[$SiO_2$]+1.933[$Al_2O_3$]+0.362[$B_2O_3$]+2.049[MgO]+1.751[CaO]+1.471[SrO]+1.039[BaO]−48.25;
a value of Formula (B) is 690 or larger and 800 or smaller, Formula (B) being 35.59[$SiO_2$]+37.34[$Al_2O_3$]+24.59[$B_2O_3$]+31.13[MgO]+31.26[CaO]+30.78[SrO]+31.98[BaO]−2761;
a value of Formula (C) is 100 or smaller, Formula (C) being −9.01[$SiO_2$]+36.36[$Al_2O_3$]+5.7[$B_2O_3$]+5.13[MgO]+17.25[CaO]+7.65[SrO]+10.58[BaO];
a value of Formula (D) is 20 or smaller, Formula (D) being −0.731[$SiO_2$]+1.461[$Al_2O_3$]−0.157[$B_2O_3$]+1.904[MgO]+3.36[CaO]+3.411[SrO]+1.723[BaO]+(−3.318[MgO][CaO]−1.675[MgO][SrO]+1.757[MgO][BaO]+4.72[CaO][SrO]+2.094[CaO][BaO]+1.086[SrO][BaO])/([MgO]+[CaO]+[SrO]+[BaO]); and the alkali-free glass has a Young's modulus of 83 GPa or larger and a surface devitrification viscosity $\eta_c$ of $10^{4.2}$ dPa·s or higher.

2. The alkali-free glass according to claim 1, further comprising F in an amount of 1.5 mol % or smaller.

3. The alkali-free glass according to claim 1, further comprising $SnO_2$ in an amount of 0.5% or smaller in mol % in terms of oxides.

4. The alkali-free glass according to claim 1, further comprising $ZrO_2$ in an amount of 0.09% or smaller in mol % in terms of oxides.

5. The alkali-free glass according to claim 1, further comprising, in mol % in terms of oxides:
$Li_2O$: 0.001% or larger, and 0.2% or smaller.

6. The alkali-free glass according to claim 1, further comprising at least one selected from the group consisting of $Li_2O$, $Na_2O$, and $K_2O$ in an amount of 0.2% or smaller in total in mole % in terms of oxides.

7. The alkali-free glass according to claim 1, wherein a value of Formula (E) is in a range of 1.50 to 5.50, Formula (E) being $4.379[SiO_2]+5.043[Al_2O_3]+4.805[B_2O_3]+4.828[MgO]+4.968[CaO]+5.051[SrO]+5.159[BaO]-453$.

8. The alkali-free glass according to claim 1, wherein the alkali-free glass has a strain point of 690° C. or higher.

9. The alkali-free glass according to claim 1, wherein the alkali-free glass has a density of 2.8 g/cm³ or lower and an average thermal expansion coefficient in 50-350° C. of $30\times10^{-7}$/° C. to $45\times10^{-7}$/° C.

10. The alkali-free glass according to claim 1, wherein the alkali-free glass has a temperature $T_2$ at which a glass viscosity becomes $10^2$ dPa·s of 1800° C. or lower and a temperature $T_4$ at which the glass viscosity becomes $10^4$ dPa·s of 1400° C. or lower.

11. The alkali-free glass according to claim 1, wherein the alkali-free glass has an internal devitrification temperature of 1320° C. or lower.

12. The alkali-free glass according to claim 1, wherein the alkali-free glass has an internal devitrification viscosity $\eta_d$ of $10^{4.4}$ dPa·s or higher.

13. The alkali-free glass according to claim 1, wherein the alkali-free glass has a crystal growth rate of 100 μm/hr or lower.

14. The alkali-free glass according to claim 1, wherein the alkali-free glass has a glass β-OH value of 0.01 mm$^{-1}$ or larger and 0.5 mm$^{-1}$ or smaller.

15. The alkali-free glass according to claim 1, wherein the alkali-free glass has an annealing point of 850° C. or lower.

16. The alkali-free glass according to claim 1, wherein the alkali-free glass has a compaction of 150 ppm or smaller when being held at 600° C. for 80 min.

17. The alkali-free glass according to claim 1, wherein the alkali-free glass has an equivalent cooling rate of 5° C./min or higher and 800° C./min or lower.

18. The alkali-free glass according to claim 1, wherein the alkali-free glass has a sludge volume of 30 ml or smaller when the alkali-free glass is subjected to an etching process.

19. The alkali-free glass according to claim 1, wherein the alkali-free glass has a photoelastic constant of 31 nm/MPa/cm or smaller.

20. A glass plate, comprising the alkali-free glass of claim 1, wherein the glass plate has a length of at least one side of 2400 mm or longer and a thickness of 1.0 mm or smaller.

21. The glass plate according to claim 20, wherein the glass plate is manufactured by a float process or a fusion process.

22. A display panel, comprising the alkali-free glass of claim 1.

23. A semiconductor device, comprising the alkali-free glass of claim 1.

24. An information recording medium, comprising the alkali-free glass of claim 1.

25. A planar antenna, comprising the alkali-free glass of claim 1.

26. A dimming laminate, comprising the alkali-free glass of claim 1.

27. A vehicular window glass, comprising the alkali-free glass of claim 1.

28. An acoustic vibration plate, comprising the alkali-free glass of claim 1.

29. An alkali-free glass, comprising, in mol % in terms of oxides:
$SiO_2$: 50-80%;
$Al_2O_3$: 8-20%;
$B_2O_3$: 1.7-5%;
$Li_2O+Na_2O+K_2O$: 0-0.2%;
$P_2O_5$: 0-1%; and
$BaO$: 1.6-6%,
wherein [MgO]/[CaO] is larger than 1.5, and the alkali-free glass has:
a Young's modulus of 83 GPa or larger;
a strain point of 690° C. or higher;
a temperature $T_4$ at which a glass viscosity becomes $10^4$ dPa·s of 1400° C. or lower;
a temperature $T_2$ at which the glass viscosity becomes $10^2$ dPa·s of 1800° C. or lower;
an internal devitrification temperature of 1320° C. or lower;
an internal devitrification viscosity $\eta_d$ of $10^{4.4}$ dPa·s or higher;
a surface devitrification viscosity $\eta_c$ of $10^{4.2}$ dPa·s or higher;
a crystal growth rate of 100 μm/hr or lower;
a density of 2.8 g/cm³ or lower;
a specific modulus of 31 or higher; and
an average thermal expansion coefficient in 50-350° C. of $30\times10^{-7}$ to $45\times10^{-7}$/° C.

30. The alkali-free glass according to claim 29, wherein $B_2O_3$ is present in an amount of 1.7-3% in mol % in terms of oxides.

31. The alkali-free glass according to claim 29, further comprising, in mol % in terms of oxides:
MgO: 0.1-15%;
CaO: 0.1-12%; and
SrO: 0-8%.

32. The alkali-free glass according to claim 29, further comprising, in mol % in terms of oxides:
MgO: 0.1-15%;
CaO: 0.1-12%; and
SrO: 0-8%,
wherein $B_2O_3$ is present in an amount of 1.7-3% in mol % in terms of oxides.

33. The alkali-free glass according to claim 29, further comprising F in an amount of 1.5 mol % or smaller.

34. The alkali-free glass according to claim 29, further comprising $SnO_2$ in an amount of 0.5% or smaller in mol % in terms of oxides.

35. The alkali-free glass according to claim 29, further comprising $ZrO_2$ in an amount of 0.09% or smaller in mol % in terms of oxides.

36. The alkali-free glass according to claim 29, wherein a value of Formula (A) is 82.5 or larger, Formula (A) being $1.131[SiO_2]+1.933[Al_2O_3]+0.362[B_2O_3]+2.049[MgO]+1.751[CaO]+1.471[SrO]+1.039[BaO]-48.25$.

37. The alkali-free glass according to claim 29, wherein a value of Formula (B) is 690 or larger and 800 or smaller, Formula (B) being $35.59[SiO_2]+37.34[Al_2O_3]+24.59[B_2O_3]+31.13[MgO]+31.26[CaO]+30.78[SrO]+31.98[BaO]-2761$.

38. The alkali-free glass according to claim 29, wherein a value of Formula (C) is 100 or smaller, Formula (C) being $-9.01[SiO_2]+36.36[Al_2O_3]+5.7[B_2O_3]+5.13[MgO]+17.25[CaO]+7.65[SrO]+10.58[BaO]$.

39. The alkali-free glass according to claim 29, wherein a value of Formula (D) is 20 or smaller, Formula (D) being $-0.731[SiO_2]+1.461[Al_2O_3]-0.157[B_2O_3]+1.904[MgO]+3.36[CaO]+3.411[SrO]+1.723[BaO]+(-3.318[MgO][CaO]-1.675[MgO][SrO]+1.757[MgO][BaO]+4.72[CaO][SrO]+2.094[CaO][BaO]+1.086[SrO][BaO])/([MgO]+[CaO]+[SrO]+[BaO])$.

40. The alkali-free glass according to claim 29, wherein a value of Formula (E) is 1.50-5.50, Formula (E) being $4.379[SiO_2]+5.043[Al_2O_3]+4.805[B_2O_3]+4.828[MgO]+4.968[CaO]+5.051[SrO]+5.159[BaO]-453$.

41. The alkali-free glass according to claim 29, wherein the alkali-free glass has a glass β-OH value of 0.01 $mm^{-1}$ or larger and 0.5 $mm^{-1}$ or smaller.

42. The alkali-free glass according to claim 29, wherein the alkali-free glass has an annealing point of 850° C. or lower.

43. The alkali-free glass according to claim 29, wherein the alkali-free glass has a compaction of 150 ppm or smaller when being held at 600° C. for 80 min.

44. The alkali-free glass according to claim 29, wherein the alkali-free glass has an equivalent cooling rate of 5° C./min or higher and 800° C./min or lower.

45. The alkali-free glass according to claim 29, wherein the alkali-free glass has a sludge volume of 30 ml or smaller when the alkali-free glass is subjected to an etching process.

46. The alkali-free glass according to claim 29, wherein the alkali-free glass has a photoelastic constant of 31 nm/MPa/cm or smaller.

47. A glass plate, comprising the alkali-free glass of claim 29, wherein the glass plate has a length of at least one side of 2400 mm or longer and a thickness of 1.0 mm or smaller.

48. The glass plate according to claim 47, wherein the glass plate is manufactured by a float process or a fusion process.

49. A display panel, comprising the alkali-free glass of claim 29.

50. A semiconductor device, comprising the alkali-free glass of claim 29.

51. An information recording medium, comprising the alkali-free glass of claim 29.

52. A planar antenna, comprising the alkali-free glass of claim 29.

53. A dimming laminate, comprising the alkali-free glass of claim 29.

54. A vehicular window glass, comprising the alkali-free glass of claim 29.

55. An acoustic vibration plate, comprising the alkali-free glass of claim 29.

* * * * *